United States Patent
Yokota et al.

(10) Patent No.: US 8,243,635 B2
(45) Date of Patent: Aug. 14, 2012

(54) INFORMATION PROCESSING APPARATUS

(75) Inventors: Koichi Yokota, Kawasaki (JP); Akira Shiba, Kawasaki (JP); Shinichi Shiotsu, Kawasaki (JP); Satoshi Kazama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/411,707

(22) Filed: Mar. 26, 2009

(65) Prior Publication Data

US 2009/0245217 A1 Oct. 1, 2009

(30) Foreign Application Priority Data

Mar. 28, 2008 (JP) .................................. 2008-88395

(51) Int. Cl.
*H04B 3/20* (2006.01)
*H04B 7/185* (2006.01)
*H04B 1/10* (2006.01)
*H04B 15/00* (2006.01)
*H04W 4/00* (2009.01)

(52) U.S. Cl. ........ 370/286; 370/317; 370/322; 375/254; 455/63.1

(58) Field of Classification Search .......... 370/282–290, 370/310–350, 386–389, 392–394; 375/254, 375/278, 284–285, 296, 346; 379/1.03–4, 379/22.08, 26.01, 29.01, 392.01; 455/63.1, 455/67.13, 570, 135, 296
See application file for complete search history.

(56) References Cited

U.S. PATENT DOCUMENTS

| | | | | |
|---|---|---|---|---|
| 6,894,943 B2 * | 5/2005 | Suzuki et al. | ............ | 365/230.03 |
| 7,280,152 B2 * | 10/2007 | Kondo | ............ | 348/441 |
| 7,853,837 B2 * | 12/2010 | Perego et al. | ............ | 714/704 |
| 2005/0159127 A1* | 7/2005 | Hirata | ............ | 455/277.2 |
| 2006/0251197 A1* | 11/2006 | Zaucha et al. | ............ | 375/350 |
| 2009/0131005 A1* | 5/2009 | Kawagishi et al. | ........ | 455/226.2 |
| 2009/0132759 A1* | 5/2009 | Kimura et al. | ............ | 711/105 |

FOREIGN PATENT DOCUMENTS

| | | |
|---|---|---|
| JP | 60-151889 | 8/1985 |
| JP | 05-020874 | 1/1993 |
| JP | 09-153281 | 6/1997 |

\* cited by examiner

*Primary Examiner* — Tri H Phan
(74) *Attorney, Agent, or Firm* — Staas & Halsey LLP

(57) ABSTRACT

An information processing apparatus includes a storage unit including plural memory banks, a wireless communication unit for executing the wireless communication process, a communication quality information storage unit for storing the communication quality information indicating the communication quality of the wireless communication unit in the case where one of the plural memory banks is used, a memory bank selection unit for selecting the memory bank based on the communication quality information stored in the communication quality information storage unit in the case where the wireless communication process is executed by the wireless communication unit, and a memory bank switching unit for switching to the memory bank selected by the memory bank selection unit.

19 Claims, 14 Drawing Sheets

| MEMORY BANK IDENTIFIER | BER INFORMATION (WIRELESS LAN) | BER INFORMATION (UMTS) |
|---|---|---|
| 1 | 0.01% | 0.20% |
| 2 | 0.22% | 0.15% |

| COMMUNICATION STANDARD | IMPORTANCE DEGREE |
|---|---|
| WIRELESS LAN | 1 |
| UMTS | 2 |

FIG. 9

| MEMORY BANK IDENTIFIER | RSSI INFORMATION (WIRELESS LAN) | RSSI INFORMATION (UMTS) |
|---|---|---|
| 1 | −90dBm | −85dBm |
| 2 | −86dBm | −92dBm |

FIG. 12

| MEMORY BANK IDENTIFIER | ACTIVE/INACTIVE INFORMATION (PC CARD) | ACTIVE/INACTIVE INFORMATION (SOUND CARD) | BER INFORMATION (WIRELESS LAN) | BER INFORMATION (UMTS) |
|---|---|---|---|---|
| 1 | ON | ON | 0.32% | 0.51% |
| 2 | ON | ON | 0.43% | 0.33% |
| 1 | ON | OFF | 0.31% | 0.50% |
| 2 | ON | OFF | 0.23% | 0.16% |
| 1 | OFF | ON | 0.02% | 0.21% |
| 2 | OFF | ON | 0.42% | 0.35% |
| 1 | OFF | OFF | 0.01% | 0.20% |
| 2 | OFF | OFF | 0.22% | 0.15% |

351

INFORMATION PROCESSING APPARATUS

CROSS-REFERENCE TO RELATED APPLICATIONS

This application is based upon and claims the benefit of priority of the prior Japanese Patent Application No. 2008-88395, filed on Mar. 28, 2008, the entire contents of which are incorporated herein by reference.

BACKGROUND

1. Field

The present embodiment relates to an information processing apparatus including a storage unit including plural memory banks and a wireless communication unit for executing a wireless communication process, or in particular, to an information processing apparatus for improving the quality of the wireless communication.

The ownership and use of the information processing apparatus (personal computer or portable terminal) having a wireless LAN (Local Area Network) communication function based on IEEE (The Institute of Electrical and Electronics Engineers, Inc.) 802.1X and a wireless communication function based on UMTS (Universal Mobile Telecommunications System) constituting a third-generation mobile unit system have extended.

2. Description of the Related Art

These information processing apparatuses poses a problem that an electromagnetic noise (hereinafter referred to simply as "noise") generated from each function unit of the apparatus itself interferes with signals transmitted/received by way of an antenna of the apparatus itself (hereinafter referred to as "antenna transmission/reception signal") thereby reducing the quality of the wireless communication. Especially, the noise generated from a main storage unit at the time of reading/writing data constitute a great factor to reduce the wireless communication quality.

In view of this, a technique for suppressing the noise generated by the main storage unit has been proposed by Japanese Patent Application Laid-open No. 9-153281 (JP9-153281). This technique is intended to suppress the noise generated when accessing the main storage unit. A signal output unit accessing the main storage unit outputs a true address signal and a true data signal to a memory bank 1 of the main storage unit as signals received from a CPU (Central Processing Unit), while an address signal and a data signal inverted from the true signals are output to a memory bank 2 of the main storage unit. As a result, currents flowing the memory banks 1 and 2 become inversely symmetric with each other thereby reducing the noise generated from the main storage unit.

SUMMARY

An information processing apparatus according to the present embodiment includes a storage unit including plural memory banks, a wireless communication unit for executing a wireless communication process, a communication quality information storage unit for storing communication quality information, indicating the quality of the communication of the wireless communication unit with one of plural memory banks in use, in correspondence with a memory bank identifier for identifying the memory bank, a memory bank selection unit for selecting the memory bank based on the communication quality information stored in the communication quality information storage unit in the case where the wireless communication process is executed by the wireless communication unit, and a memory bank switching unit for switching to the memory bank selected by the memory bank selection unit.

Other aspects and advantages of the embodiment will be set forth in part in the description which follows, and in part will be obvious from the description, or may be learned by practice of the invention. The aspects and advantages of the invention will be realized and attained by the elements and combinations particularly described reference being had to the accompanying drawings form a part hereof, wherein like numerals refer to like parts throughout and pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating a BER information storage unit.

FIG. 4 is a diagram illustrating an importance degree storage unit.

FIG. 9 is a diagram illustrating a RSSI information storage unit.

FIG. 12 is a diagram illustrating a BER information storage unit.

DETAILED DESCRIPTION OF THE PREFERRED EMBODIMENTS

Figure 1:
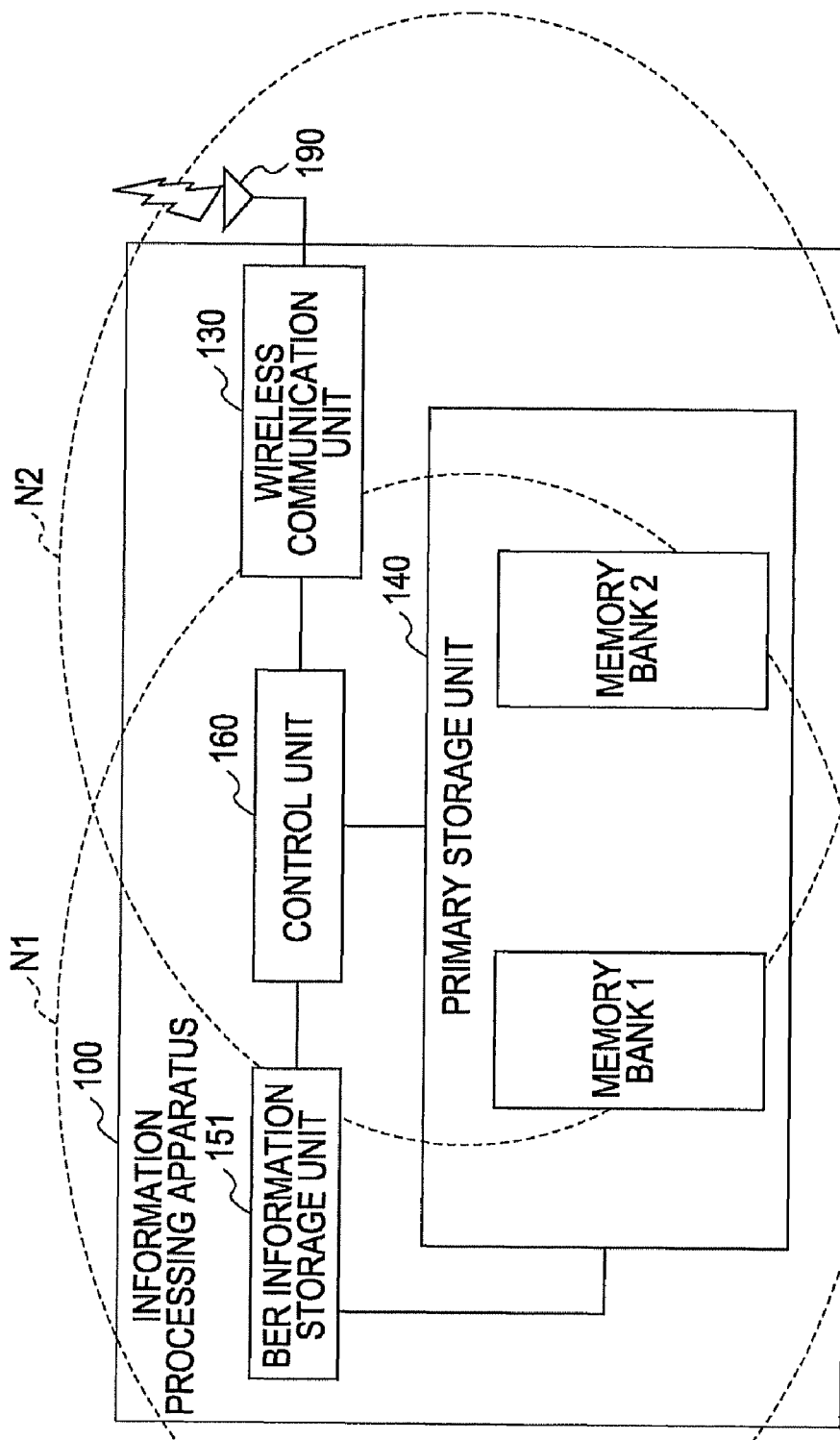
FIG. 1 is a diagram for explaining an embodiment.

JP9-153281 discusses a technique only to reduce a noise generated from a bus connecting a signal output unit and a main storage unit in spite of the fact that the noise is generated mainly from the main storage unit itself.

A through current flows, for example, in the main storage unit including the CMOS (Complementary Metal Oxide Semiconductor) structure. According to the technique discussed by JP9-153281, however, the noise is generated by the flow of this through current.

Also, in the case where the data is read from the main storage unit, the signal output unit cannot output the inverted data signal, and therefore, the technique discussed in JP9-153281 cannot sufficiently reduce even the noise generated from the bus connecting the signal output unit and the main storage unit.

As described above, even by use of the technique discussed in JP9-153281, the noise generated by the main storage unit itself interferes with an antenna transmission/reception signal and the wireless communication quality cannot be sufficiently improved.

According to the present embodiment, the interference between the noise generated from the main storage unit itself and the antenna transmission/reception signal is reduced and the wireless communication quality is improved.

The information processing apparatus according to the embodiment includes a storage unit, a wireless communication unit, a communication quality information storage unit, a memory bank selection unit and a memory bank switching unit. The storage unit has plural memory banks. The wireless communication unit executes the wireless communication process. The communication quality information storage unit stores the communication quality information indicating the communication quality of the wireless communication unit in the case where the information processing apparatus uses one of the plural memory banks, in correspondence with the bank identifier for identifying the memory bank. The communication quality information storage unit corresponds to "BER information storage unit 151," "BER information storage unit 351" or "RSSI information storage unit 251" according to another embodiment. The memory bank selection unit, based on the communication quality information stored in the communication quality information storage unit, selects the memory bank which most improves the communication quality of the wireless communication unit in the case where the wireless communication process is executed by the wireless communication unit. The memory bank switching unit switches the memory bank used by the information processing apparatus to the one selected by the memory bank selection unit. The memory bank switching unit corresponds to "a bank selector 141" according to the embodiments. In the information processing apparatus according to this embodiment, the wireless communication quality is automatically improved unconsciously on the part of the user (i.e., without user knowledge or input/automatically) by the function to activate the memory bank which most improves the communication quality.

Incidentally, as another aspect of the embodiment, the constituent elements, expression or an arbitrary combination of the constituent elements of the information processing apparatus according to this embodiment are effectively applicable also to a method, an apparatus, a system, a computer program, a computer readable recording medium or a data structure.

The information processing apparatus according to this embodiment reduces the interference between the noise generated from the main storage unit itself and the antenna transmission/reception signal and thus improves the wireless communication quality.

The information processing apparatus, the information processing apparatus control method and the information processing apparatus control program according to this embodiment are explained in detail with reference to the drawings.

First, with reference to FIG. 1, the outline of the information processing apparatus according to an embodiment is explained. FIG. 1 is a diagram for explaining the outline of the information processing apparatus 100 according to this embodiment. As illustrated in FIG. 1, the information processing apparatus according to this embodiment is intended for wireless communication with a base station or other information processing apparatuses. The information processing apparatus 100 includes a wireless communication unit 130, a primary storage unit 140, a BER (bit error rate) information storage unit 151, a control unit 160 and an antenna 190. The wireless communication unit 130 executes the wireless communication process. The primary storage unit 140 includes memory banks 1 and 2. The control unit 160 executes the process constituting the feature of the information processing apparatus 100 according to this embodiment. The antenna 190 transmits and receives signals between the information processing apparatus 100 and the base station or the like.

In the information processing apparatus 100 according to this embodiment, a value of BER (hereinafter referred to simply as "BER value") for the wireless communication with the information processing apparatus 100 using the memory bank 1 or 2 is stored in the BER information storage unit 151. Specifically, in the case where the information processing apparatus 100 uses the memory bank 1, a noise N1 is generated from the memory bank 1. The information processing apparatus 100 measures the BER value for wireless communication with the noise N1 generated, and stores this BER value in the BER information storage unit 151. In similar fashion, the use of the memory bank 2 by the information processing apparatus 100 generates a noise N2 from the memory bank 2, and the information processing apparatus 100 measures the BER value for wireless communication with the noise N2 generated and stores the BER value in the BER information storage unit 151.

The BER value for wireless communication is varied depending on which memory bank, 1 or 2, is used by the information processing apparatus 100. One reason is that the effect of the noise N1 generated from the memory bank 1 on the antenna 190 and the effect of the noise N2 generated from the memory bank 2 on the antenna 190 are different from each other depending on the location of each memory device in the information processing apparatus 100.

As illustrated in FIG. 1, for example, assume that the antenna 190 is arranged nearer to the memory bank 2 than to the memory bank 1, the signal transmitted or received by the antenna 190 is considered more liable to interfere with the noise N2 generated from the memory bank 2 located nearer to the antenna 190 than with the noise N1 generated from the memory bank 1. Specifically, when the memory bank 1 is used, the BER value for wireless communication of the information processing apparatus 100 is smaller resulting in a higher wireless communication quality than when the memory bank 2 is used.

In the information processing apparatus 100 according to this embodiment, considering the fact that the BER value for wireless communication is varied depending on the memory bank used, selected one of the memory banks 1 and 2 is used based on the BER value stored in the BER information storage unit 151 under the control of the control unit 160.

The control operation of the control unit 160 is specifically explained. The control unit 160 judges whether the wireless communication unit 130 is activated or not, and in the case where the wireless communication unit 130 is activated, that is to say, in the case where the wireless communication is being conducted, acquires the BER value stored in the BER information storage unit 151. Based on the BER value thus acquired, the control unit 160 judges which should be used, the memory bank 1 or the memory bank 2, to reduce the BER value for wireless communication, and instructs the primary storage unit 140 to use the memory bank associated with a smaller BER value. The primary storage unit 140, upon reception of this instruction, uses one of the memory bank 1 or 2 in accordance with the instruction from the control unit 160.

As a result, the information processing apparatus 100 according to this embodiment reduces the interference between the noise generated by the primary storage unit 140 itself and the signal transmitted or received by the antenna 190 to improve the wireless communication quality.

Next, the information processing apparatus 100 according to this embodiment is explained. Incidentally, the description that follows assumes that the information processing apparatus 100 is a notebook-sized personal computer including the wireless LAN communication function and the UMTS communication function. Also, the explanation is given below about an example in which the information processing apparatus 100 selects the memory bank used at the time of activating itself.

Figure 2:
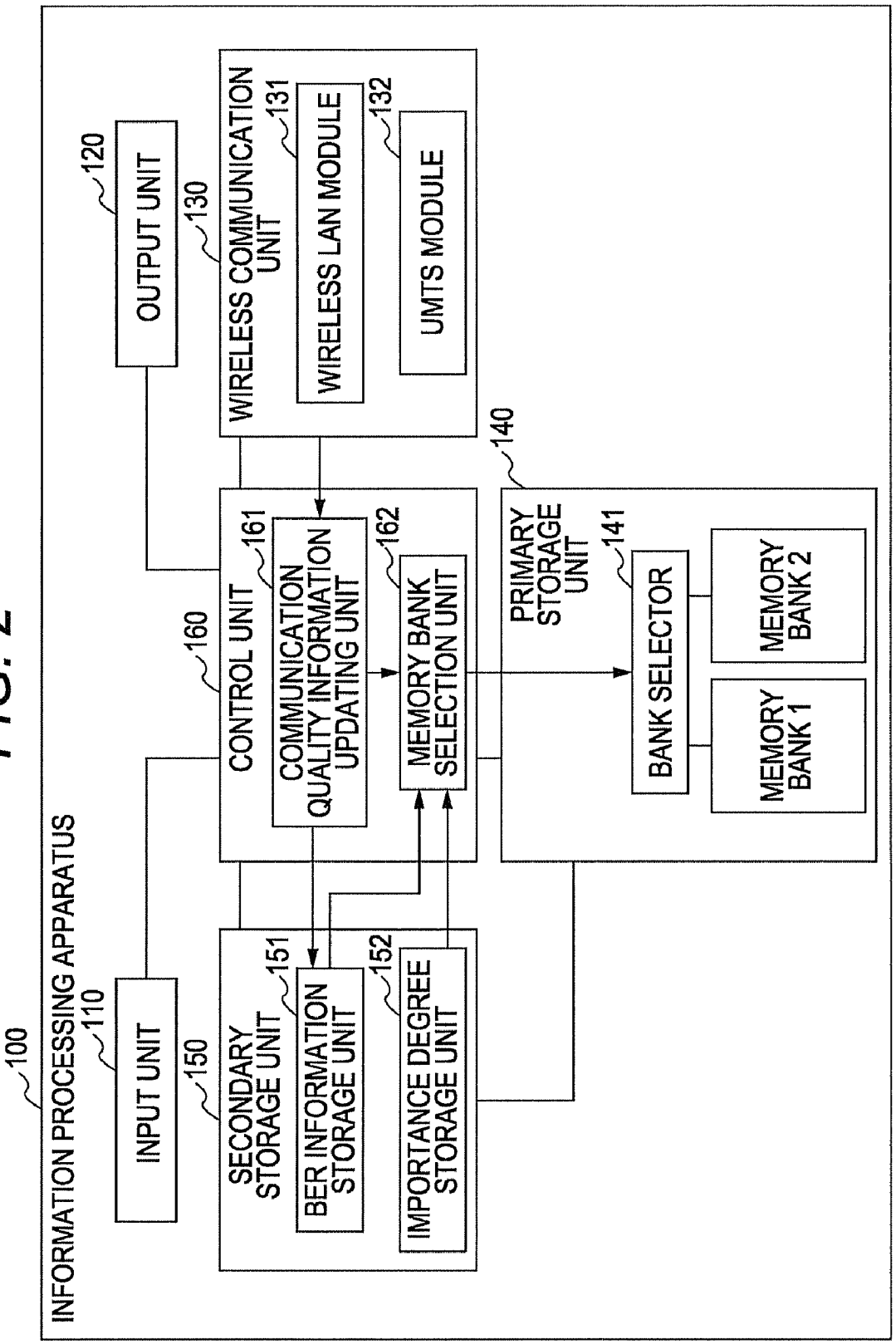
FIG. 2 is a block diagram illustrating this embodiment.

FIG. 2 is a block diagram illustrating the information processing apparatus 100 according to this embodiment. As illustrated in FIG. 2, the information processing apparatus 100 includes an input unit 110, an output unit 120, a wireless communication unit 130, a primary storage unit 140, a secondary storage unit 150 and a control unit 160.

The input unit 110 is an input device such as a keyboard or a mouse for inputting various information and operation commands. The output unit 120 is a display device such as a liquid crystal display for displaying various information.

The wireless communication unit 130 is a function unit for executing the wireless communication process and includes a wireless LAN module 131 and a UMTS module 132. The wireless LAN module 131 is a processing unit to execute the process for the wireless LAN communication and realizes the wireless LAN communication based on, for example, IEEE802.1X. This wireless LAN module 131 is connected to a wireless LAN communication antenna not illustrated.

The UMTS module 132 is a processing unit for executing the process for the UMTS communication, and realizes the UMTS communication according to HSDPA or HSUPA. This UMTS module 132 is connected to a UMTS communication antenna not illustrated.

The timing at which the wireless LAN module 131 and the UMTS module 132 described above are activated to execute the wireless LAN communication or the UMTS communication is varied depending on the specification and the setting of the information processing apparatus 100. In the case of the specification or setting in which both the wireless LAN module 131 and the UMTS module 132 are activated at the time of activation of the information processing apparatus 100, for example, the information processing apparatus 100 starts the wireless LAN communication and the UMTS communication at the time of activation of the information processing apparatus 100.

In the case of the specification or setting in which one of the wireless LAN module 131 and the UMTS module 132 is activated at the time of activation of the information processing apparatus 100, on the other hand, the information processing apparatus 100 starts one of the wireless LAN communication and the UMTS communication at the time of activation of the information processing apparatus 100.

In the case of the specification or setting in which neither the wireless LAN module 131 nor the UMTS module 132 is activated at the time of activation of the information processing apparatus 100, assume that the user performs the operation to start the wireless LAN communication or the UMTS communication. The information processing apparatus 100 activates the wireless LAN module 131 or the UMTS module 132 and starts the wireless LAN communication or the UMTS communication, as the case may be.

The primary storage unit 140 constituting the main storage unit has the memory banks 1 and 2 and a bank selector 141. The memory banks 1 and 2 are a mass of memories such as DIMM (Dual Inline Memory Module).

The bank selector 141 is a processing unit for switching the memory bank used by the CPU, etc. Specifically, the bank selector 141 transmits a signal designating the memory bank 1 or 2 (hereinafter referred to as "the bank designation signal") to the memory bank 1 or 2 and thereby switches the bank 1 or 2 used by the CPU, etc. The memory bank 1 or 2 that has received the bank designation signal enters a usable mode (active mode).

The secondary storage unit 150 is an auxiliary storage unit such as a hard disk device and includes a BER information storage unit 151 and an importance degree storage unit 152. The BER information storage unit 151 stores the wireless communication quality in the case where the information processing apparatus 100 uses one of the memory banks 1 and 2.

An example of the BER information storage unit 151 is illustrated in FIG. 3. As illustrated in FIG. 3, the BER information storage unit 151 contains the BER information (wireless LAN) indicating the quality of the wireless communication and the BER information (UMTS) in correspondence with the memory bank identifier. The memory bank identifier stores the identification information for identifying the memory bank. In the description that follows, the memory bank identifier of the memory bank 1 is designated as "1", and the memory bank identifier of the memory bank 2 as "2."

Also, the BER information (wireless LAN) of the BER information storage unit 151 contains the BER value for wireless LAN communication in the case where the information processing apparatus 100 uses the memory bank indicated by the memory bank identifier. The BER information (UMTS) of the BER information storage unit 151, on the other hand, contains the BER value for UMTS communication in the case where the information processing apparatus 100 uses the memory bank indicated by the memory bank identifier.

Specifically, in the case where the information processing apparatus 100 uses the memory bank 1, the first row of the table illustrating the information stored by the BER information storage unit 151 illustrated in FIG. 3 indicates the BER value "0.01%" for wireless LAN communication and "0.20%" for UMTS communication.

In the case where the information processing apparatus 100 uses the memory bank 2, on the other hand, the second row of the table illustrating the information stored by the BER information storage unit 151 illustrated in FIG. 3 indicates the BER value "0.22%" for wireless LAN communication and "0.15%" for UMTS communication.

The importance degree storage unit 152 stores the degree of importance or a priority of the wireless communication for each wireless communication standard. An example of the importance degree storage unit 152 is illustrated in FIG. 4. As illustrated in FIG. 4, the importance degree storage unit 152 stores the importance degree in correspondence with the communication standard.

The communication standard stores the identification information for the information processing apparatus 100 to uniquely identify the wireless communication standard that can be carried out. In the description that follows, the communication standard of the wireless LAN communication realized by the wireless LAN module 131 is designated as "wireless LAN," and the communication standard of the UMTS communication realized by the UMTS module 132 as "UMTS."

The importance degree stored in the importance degree storage unit 152 is the one of the wireless communication indicated by the communication standard. The importance degree stored in the importance degree storage unit 152 illustrated in FIG. 3 is assumed to be higher, as the numerical value is small. Specifically, the example illustrated in FIG. 3 illustrates that the importance degree of the wireless LAN communication indicated by the wireless standard "wireless LAN" is higher than that of the UMTS communication indicated by the wireless standard "UMTS."

The control unit 160 executes the process constituting the feature of the information processing apparatus 100 according to this embodiment, and includes a communication quality information updating unit 161 and a memory bank selection unit 162.

The communication quality information updating unit 161 starts the process after activation of the information processing apparatus 100. The communication quality information updating unit 161 judges whether the wireless LAN module 131 and the UMTS module 132 are activated or not. In the case where they are active, the communication quality information updating unit 161 judges whether the BER value of the active communication standard is stored in the BER information (wireless LAN) or the BER information (UMTS) of the BER information storage unit 151. In the case where the BER value is not so stored, the communication quality information updating unit 161 acquires the BER value from the wireless LAN module 131 or the UMTS module 132. The communication quality information updating unit 161 stores the acquired BER value in the BER information (wireless LAN) or the BER information (UMTS) of the BER information storage unit 151.

Specifically, the communication quality information updating unit 161, upon judgment that the wireless LAN module 131 is started, judges whether the BER value is stored in the BER information (wireless LAN) of the BER information storage unit 151. In the case where the BER value is not stored in the BER information (wireless LAN) of the BER information storage unit 151, the communication quality information updating unit 161 instructs the memory bank selection unit 162, described later, to activate the memory bank 1. After that, the communication quality information updating unit 161 acquires the BER value for wireless LAN communication from the wireless LAN module 131 with the memory bank 1 used. Then, the communication quality information updating unit 161 stores the acquired BER value in the BER information (wireless LAN) corresponding to the memory bank identifier "1" of the BER information storage unit 151.

Then, the communication quality information updating unit 161 instructs the memory bank selection unit 162 to activate the memory bank 2, and acquires, from the wireless LAN module 131, the BER value for wireless LAN communication with the memory bank 2 used. Then, the communication quality information updating unit 161 stores the acquired BER value in the BER information (wireless LAN) corresponding to the memory bank identifier "2" of the BER information storage unit 151.

The communication quality information updating unit 161, upon judgment that the UMTS module 132 is active, judges whether the BER value is stored in the BER information (UMTS) of the BER information storage unit 151. In the case where the BER value is not stored in the BER information (UMTS) of the BER information storage unit 151, the communication quality information updating unit 161 instructs the memory bank selection unit 162 to activate the memory bank 1. Then, the communication quality information updating unit 161 acquires the BER value for UMTS communication from the UMTS module 132 with the memory bank 1 used. The communication quality information updating unit 161 stores the acquired BER value in the BER information (UMTS) corresponding to the memory bank identifier "1" of the BER information storage unit 151.

Then, the communication quality information updating unit 161 instructs the memory bank selection unit 162 to activate the memory bank 2. The communication quality information updating unit 161 acquires, from the UMTS module 132, the BER value for UMTS communication with the memory bank 2 used. The communication quality information updating unit 161 stores the acquired BER value in the BER information (UMTS) corresponding to the memory bank identifier "2" of the BER information storage unit 151.

Also, the communication quality information updating unit 161, upon judgment that both the wireless LAN module 131 and the UMTS module 132 are active, acquires the importance degree from the importance degree storage unit 152, and judges whether the BER value of the acquired communication standard higher in importance degree is stored or not in the BER information of the BER information storage unit 151. In the case where the BER value is not stored in the BER information of the BER information storage unit 151, the communication quality information updating unit 161 acquires the BER value from the wireless LAN module 131 or the UMTS module 132. The communication quality information updating unit 161 stores the acquired BER value in the BER information of the BER information storage unit 151.

The example illustrated in FIG. 4 is explained. The communication quality information updating unit 161, upon judgment that both the wireless LAN module 131 and the UMTS module 132 are active, acquires the importance degree "1" of the communication standard "wireless LAN" and the importance degree "2" of the communication standard "UMTS" from the importance degree storage unit 152. The importance degree "1" of the communication standard "wireless LAN" is higher than the importance degree "2" of the communication standard "UMTS". Therefore, the communication quality information updating unit 161 judges whether the BER value is stored in the BER information (wireless LAN) of the BER information storage unit 151 or not.

In the case where the BER value is not stored in the BER information (wireless LAN) of the BER information storage unit 151, the communication quality information updating unit 161 acquires the BER value from the wireless LAN module 131. Specifically, the communication quality information updating unit 161 acquires the BER value for the wireless LAN communication with the memory bank 1 used. The communication quality information updating unit 161 acquires the BER value for the wireless LAN communication with the memory bank 2 used. Then, the communication quality information updating unit 161 stores the acquired BER value in the BER information (wireless LAN) of the BER information storage unit 151.

The memory bank selection unit 162 is a processing unit for selecting a memory bank for improving the wireless communication quality, based on the BER value stored in the BER information (wireless LAN) or BER information (UMTS) of the BER information storage unit 151.

Specifically, the memory bank selection unit 162 acquires, from the BER information storage unit 151, the BER value of the active communication standard judged by the communication quality information updating unit 161. Then, the memory bank selection unit 162 specifies the memory bank identifier smaller in the acquired BER value, and instructs the bank selector 141 to activate the memory bank 1 or 2 as indicated by the specified memory bank identifier.

An explanation is given with reference to the example illustrated in FIG. 3. In this case, assume that the communication quality information updating unit 161 judges that the wireless LAN module 131 is active and the UMTS module 132 is not active. In such a case, the memory bank selection unit 162 acquires, from the BER information storage unit 151, the BER value "0.01%" stored in the BER information (wireless LAN) corresponding to the memory bank identifier "1" and the BER value "0.22%" stored in the BER information (wireless LAN) corresponding to the memory bank identifier "2". The BER value "0.01%" corresponding to the memory bank identifier "1" is smaller than the BER value "0.22%" corresponding to the memory bank identifier "2". Therefore, the memory bank selection unit 162 instructs the bank selector 141 to activate the memory bank 1 indicated by the memory bank identifier "1".

Also, in the case where the communication quality information updating unit 161 judges that the wireless LAN module 131 is not active but the UMTS module 132 is active, the memory bank selection unit 162 acquires from the BER information storage unit 151 the BER value "0.20%" stored in the BER information (UMTS) corresponding to the memory bank identifier "1" and the BER value "0.15%" stored in the BER information (UMTS) corresponding to the memory bank identifier "2". The BER value "0.15%" corresponding to the memory bank identifier "2" is smaller than the BER value "0.20%" corresponding to memory bank identifier "1". Therefore, the memory bank selection unit 162 instructs the bank selector 141 to activate the memory bank 2 corresponding to the memory identifier "2".

Specifically, assuming that the BER information storage unit 151 is in the state illustrated in FIG. 3 and that the specification is such that the wireless LAN module 131 is activated at the time of activation of the information processing apparatus 100, then the information processing apparatus uses the memory bank 1, while in the case where the specification is such that the UMTS module is so activated, the information processing apparatus 100 uses the memory bank 2.

Figure 5:
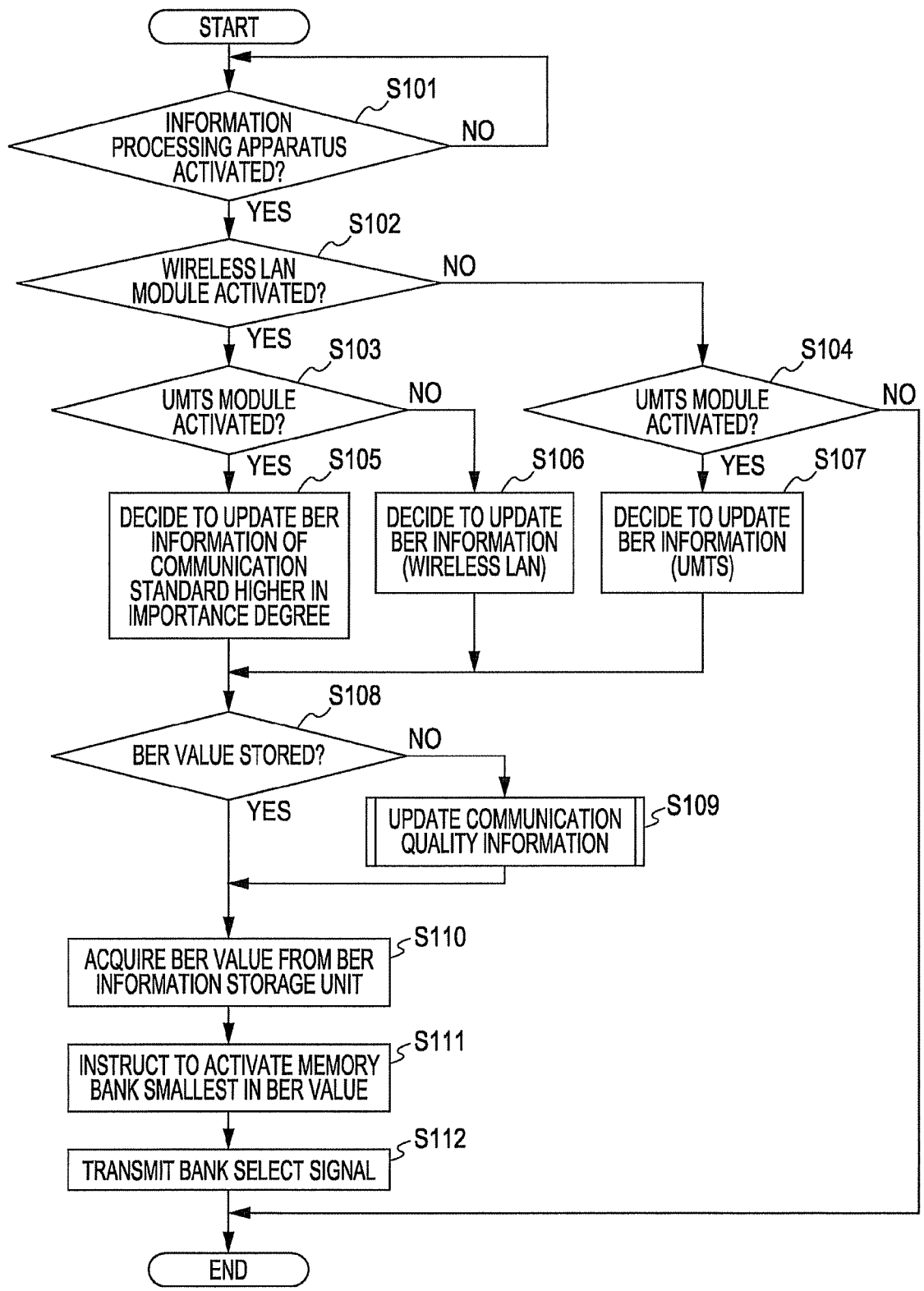
FIG. 5 is a flowchart of selecting the memory bank.

Next, the memory bank selection process by the information processing apparatus 100 according to this embodiment is explained. FIG. 5 is a flowchart of memory bank selection by the information processing apparatus 100 according to this embodiment.

As illustrated in FIG. 3, upon activation of the information processing apparatus 100 (YES in operation S101), the communication quality information updating unit 161 of the information processing apparatus 100 judges whether the wireless LAN module 131 and the UMTS module 132 are activated or not.

In the case where the wireless LAN module 131 is activated (YES in operation S102) and so is the UMTS module 132 (YES in operation S103), the communication quality information updating unit 161 acquires the importance degree from the importance degree storage unit 152 and decides to update the BER information of the communication standard higher in importance degree (operation S105). In the case where the importance storage unit 152 is in the state illustrated in FIG. 4, for example, the communication quality information updating unit 161 decides to update the BER information (wireless LAN) stored in the BER information storage unit 151.

In the case where the wireless LAN module 131 is activated (YES in operation S102) while the UMTS module 132 is not activated (NO in operation S103), on the other hand, the communication quality information updating unit 161 decides to update the BER information (wireless LAN) stored in the BER information storage unit 151 (operation S106).

In the case where the wireless LAN module 131 is not activated (NO in operation S102) while the UMTS module 132 is activated (YES in operation S104), the communication quality information updating unit 161 decides to update the BER information (UMTS) stored in the BER information storage unit 151 (operation S107).

The communication quality information updating unit 161 judges whether the BER values of the communication standard determined in the operations S105 to S107 described above are contained in the BER information stored in the BER information storage unit 151 or not.

In the case where the BER value is not stored as the BER information in the BER information storage unit 151 (NO in operation S108), the communication quality information updating unit 161 executes the communication quality information updating process for updating the BER information stored in the BER information storage unit 151 (operation S109). Incidentally, the communication quality information updating process by the communication quality information updating unit 161 is explained later with reference to FIG. 6.

In the case where the BER value is stored as the BER information in the BER information storage unit 151 (YES in operation S108) or the communication quality information updating process by the communication quality information updating unit 161 is completed (operation S109), the memory bank selection unit 162 acquires, from the BER information storage unit 151, the BER value of the active communication standard judged by the communication quality information updating unit 161 (operation S110).

Then, the memory bank selection unit 162 instructs the bank selector 141 to activate the memory bank 1 or 2 indicated by the memory bank identifier smaller in the acquired BER value (operation S111).

The bank selector 141 that has received this instruction transmits a bank designation signal to the memory bank 1 or 2 in accordance with the instruction from the memory bank selection unit 162 (operation S112). As a result, one of the memory banks 1 and 2 is activated, and the active one of the memory banks 1 and 2 is used by the CPU or the like.

Figure 6:
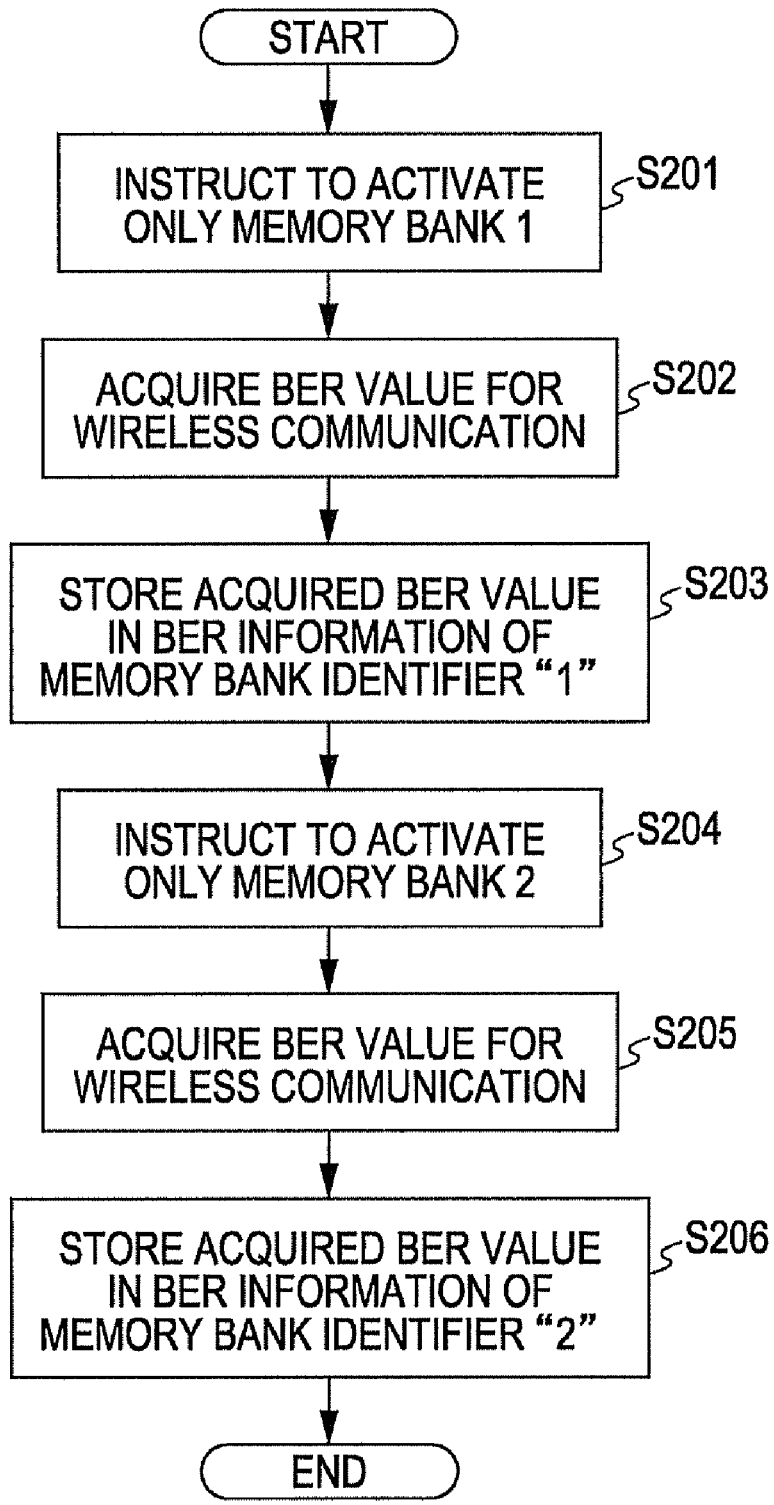
FIG. 6 is a flowchart of updating the communication quality information.

Next, the communication quality information updating process by the communication quality information updating unit 161 illustrated in FIG. 2 is explained. FIG. 6 is a flowchart of the communication quality information updating process executed by the communication quality information updating unit 161 illustrated in FIG. 2.

As illustrated in FIG. 6, the communication quality information updating unit 161 instructs the memory bank selection unit 162 to activate the memory bank 1 (operation S201). After that, the communication quality information updating unit 161 acquires, from the wireless LAN module 131 or the UMTS module 132, the BER value for the wireless communication (the wireless LAN communication or the UMTS communication) with the memory bank 1 used (operation S202).

In the case where the wireless LAN module 131 is active and the UMTS module 132 inactive, for example, the communication quality information updating unit 161 acquires the BER value from the wireless LAN module 131. In the case where the wireless LAN module 131 is inactive and the UMTS module 132 active, on the other hand, the communication quality information updating unit 161 acquires the BER value from the UMTS module 132.

The communication quality information updating unit 161 stores the acquired BER value in the BER information (wireless LAN) or the BER information (UMTS) corresponding to the memory bank identifier "1" of the BER information storage unit 151 (operation S203). As explained above, the BER value, if acquired from the wireless LAN module 131, is stored in the BER information (wireless LAN), while the BER value, if acquired from the UMTS module 132, is stored in the BER information (UMTS).

Then, the communication quality information updating unit 161 instructs the memory bank selection unit 162 to activate the memory bank 2 (operation S204), acquires the BER value with the memory bank 2 used, from the wireless LAN module 131 or the UMTS module 132 (operation S205). Further, the communication quality information updating unit 161 stores the acquired BER value in the BER information (wireless LAN) or the BER information (UMTS) corresponding to the memory bank identifier "2" of the BER information storage unit 151 (operation S206).

The BER information storage unit 151 stores the BER value for wireless communication with the information processing apparatus 100 using one of the memory banks 1 and 2. The memory bank selection unit 162, based on the BER value stored in the BER information storage unit 151, instructs the memory bank selector 141 to use the memory bank 1 or 2, whichever is smaller in the BER value for wireless communication. The bank selector 141, in accordance with the instruction from the memory bank selection unit 162, transmits a bank designation signal to the memory bank 1 or 2 in such a manner as to activate the memory bank 1 or 2. As a result, the information processing apparatus 100 according to the aforementioned embodiment reduces the interference between the noise generated from the primary storage unit 140 itself and the signal transmitted or received by the antenna 190, thereby making it possible to improve the wireless communication quality.

Also, in the case where the BER value is not stored in the BER information storage unit 151, the communication quality information updating unit 161 acquires the BER value from the wireless LAN module 131 or the UMTS module 132 and stores it as the BER information in the BER information storage unit 151. In the information processing apparatus 100 according to this embodiment, therefore, the BER value is not required to be set manually in the BER information storage unit 151. Specifically, the wireless communication quality is improved by reducing the interference between the noise generated from the primary storage unit 140 itself and the signal transmitted/received by the antenna 190 without any special operation to set the BER value in the BER information storage unit 151.

The importance degree storage unit 152 stores the importance degree for each wireless communication standard executable by the information processing apparatus 100. In the case where plural wireless LAN modules 131 and UMTS modules 132 are active, the memory bank selection unit 162 reads the communication standard high in importance degree stored in the BER information storage unit 151. The memory bank selection unit 162 instructs the bank selector 141 to use the memory bank 1 or 2, whichever minimizes the BER value for wireless communication. Even in the case where plural communication standards are packaged in the information processing apparatus 100 according to this embodiment, therefore, the wireless communication quality is improved for the communication standard high in importance degree. Also, the user may select the desired communication standard to improve the wireless communication quality, for example, by editing the importance degree storage unit 152 through the input unit 110.

According to the embodiment described above, the communication quality information updating unit 161 acquires the BER value from the wireless LAN module 131 or the UMTS module 132 and stores it in the BER information storage unit 151 in the case where the BER information is not stored in the BER information storage unit 151. Nevertheless, this embodiment is not limited to this configuration. Specifically, the communication quality information updating unit 161 may alternatively acquire the BER value from the active wireless LAN module 131 or UMTS module 132 and update the BER information of the BER information storage unit 151 each time the information processing apparatus 100 is activated. As another alternative, the communication quality information updating unit 161 may update the BER information of the BER information storage unit 151 by acquiring the BER value from the active wireless LAN module 131 or UMTS module 132 at regular time intervals (for example, once every hour).

Figure 7:
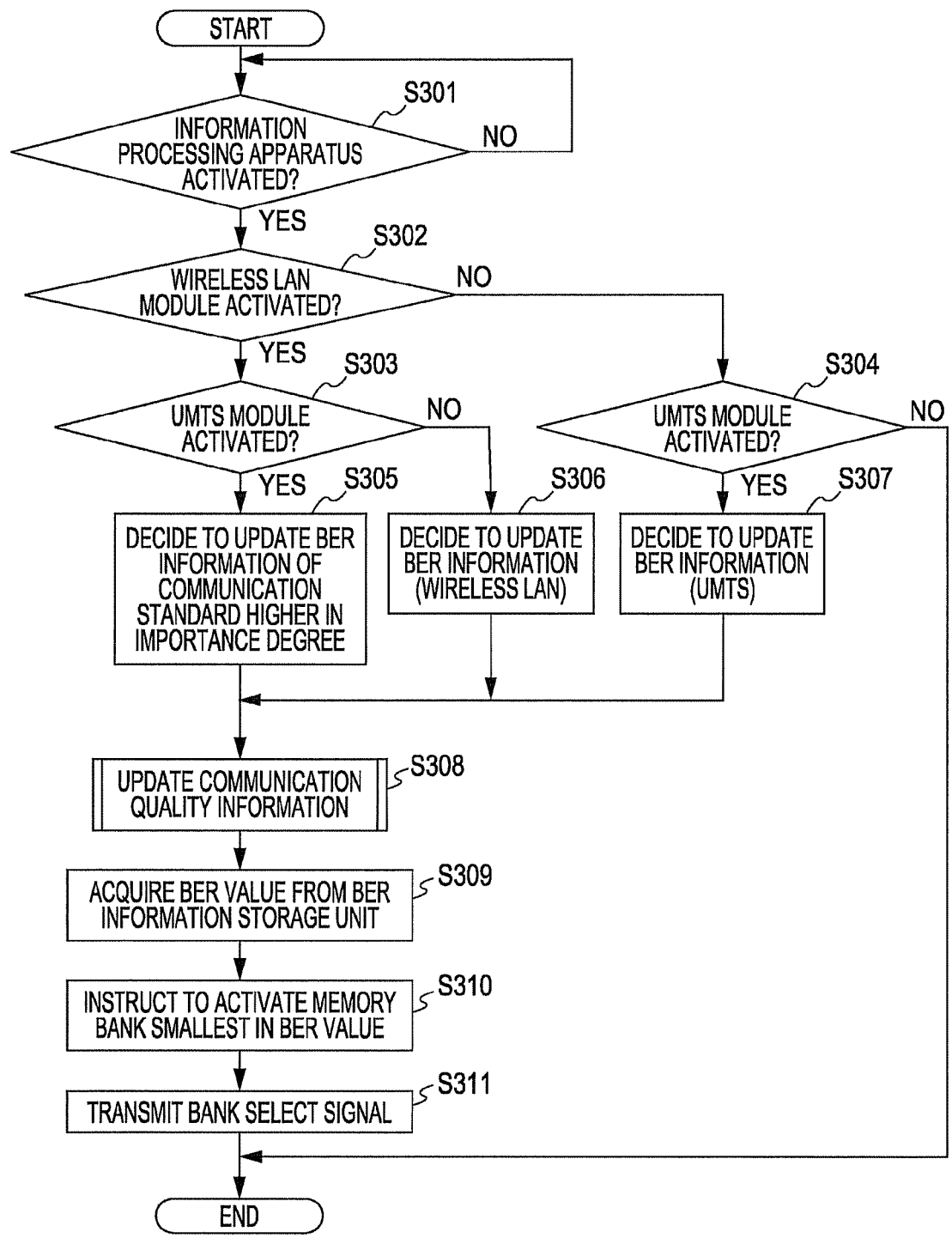
FIG. 7 is a flowchart of selecting the memory bank.

Now, an explanation is given about the memory bank selection process executed by the information processing apparatus 100 in the case where the BER information storage unit 151 is updated each time the information processing apparatus 100 is activated. FIG. 7 is a flowchart of the memory bank selection process executed by the information processing apparatus 100 in the case where the BER information storage unit 151 is updated each time the information processing apparatus 100 is activated. Incidentally, the explanation of the same steps of the process as those illustrated in FIG. 5 will not be repeated.

As illustrated in FIG. 7, the communication quality information updating unit 161 executes the communication quality information updating process to update the BER information of the BER information storage unit 151 corresponding to the communication standard determined in the operations S305 to S307 (operation S308). Incidentally, the steps of the communication quality information updating process are similar to those illustrated in FIG. 6.

Even in the case where the BER value is changed by the environment in which the information processing apparatus 100 is activated, therefore, the BER value conforming with the environment change is stored in the BER information storage unit 151. In this way, the wireless communication quality is improved in keeping with the environment change.

Another Embodiment

The embodiment described above represents an example in which the BER is used as an indicator of the wireless communication quality of the information processing apparatus 100. Alternatively, the RSSI (Received Signal Strength Indication) may be used as an indicator of the wireless communication quality. Now, this embodiment is described with reference to a case in which the RSSI is used as an indicator of the wireless communication quality.

Figure 8:
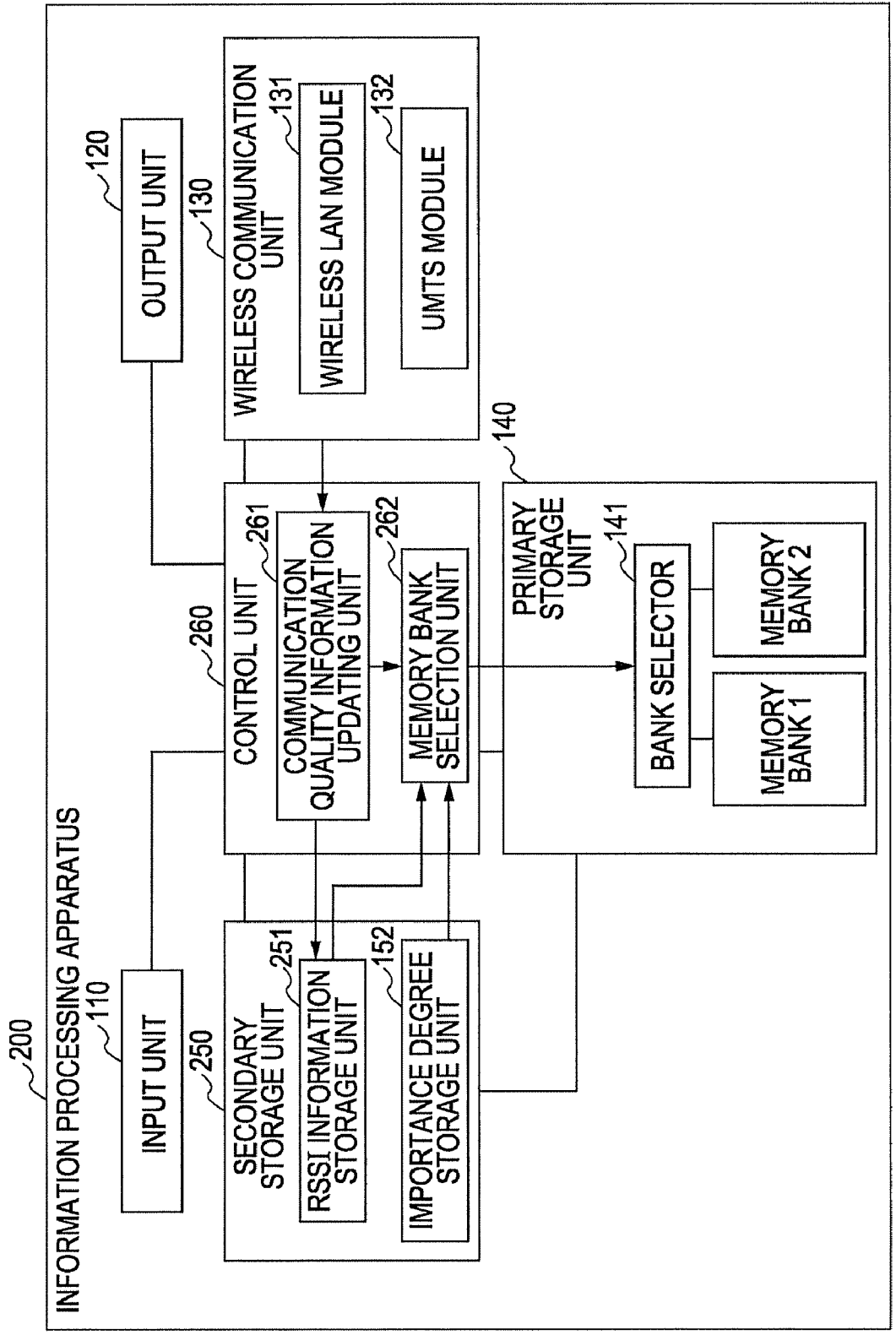
FIG. 8 is a block diagram illustrating another embodiment.

FIG. 8 is a block diagram illustrating an information processing apparatus 200 according to this embodiment. As illustrated in FIG. 8, the information processing apparatus 200 includes an input unit 110, an output unit 120, a wireless communication unit 130, a primary storage unit 140, a secondary storage unit 250 and a control unit 260. Incidentally, the component parts including similar functions to those in FIG. 2 are designated by the same reference numerals, respectively, and not described in detail.

The secondary storage unit 250, as compared with the secondary storage unit 150 illustrated in FIG. 2, has a RSSI information storage unit 251 in place of the BER information storage unit 151. The RSSI information storage unit 251 stores the RSSI for wireless communication in the case where one of the memory banks 1 and 2 is used by the information processing apparatus 200.

An example of the RSSI information storage unit 251 is illustrated in FIG. 9. As illustrated in FIG. 9, the RSSI information storage unit 251 includes the RSSI information (wireless LAN) and the RSSI information (UMTS) in correspondence with the memory bank identifier. The RSSI information (wireless LAN) stored is the value of RSSI for the wireless LAN communication (the value of RSSI is hereinafter referred to as "the RSSI value") in the case where the information processing apparatus 200 uses the memory bank indicated by the memory bank identifier. The RSSI information (UMTS), on the other hand, is stored as the RSSI value for UMTS communication in the case where the information processing apparatus 200 uses the memory bank indicated by the memory bank identifier.

Specifically, the first row of the table illustrating the information stored in the RSSI information storage unit 251 in FIG. 9 represents the RSSI value of "−90 dBm" for the wireless LAN communication and the RSSI value of "−85 dBm" for UMTS communication in the case where the information processing apparatus 200 uses the memory bank 1.

Also, the second row of the table illustrating the information stored in the RSSI information storage unit 251 in FIG. 9 represents the RSSI value of "−86 dBm" for the wireless LAN communication and the RSSI value of "−92 dBm" for the UMTS communication in the case where the information processing apparatus 200 uses the memory bank 2.

The control unit 260 includes a communication quality information updating unit 261 and a memory bank selection unit 262. In the case where the RSSI value is not stored as the RSSI information in the RSSI information storage unit 251 after activation of the information processing apparatus 200, the communication quality information updating unit 261 acquires the RSSI value for wireless LAN communication from the wireless LAN module 131 or the RSSI value for UMTS communication from the UMTS module 132, and stores the acquired RSSI value as the RSSI information in the RSSI information storage unit 251.

The process executed by the communication quality information updating unit 161 explained in the aforementioned embodiment and the process executed by the communication quality information updating unit 261 are different from each other in that the communication quality information updating unit 161 executes a process to store the BER value as the BER information in the BER information storage unit 151 while the communication quality information updating unit 261 executes a process to store the RSSI value as the RSSI information in the RSSI information storage unit 251. The other processes executed by the communication quality information updating unit 161 are identical with those executed by the communication quality information updating unit 261.

The memory bank selection unit 262 is a processing unit for selecting the memory bank to improve the wireless communication quality, based on the RSSI value stored as the RSSI information or the RSSI information (UMTS) in the RSSI information storage unit 251.

Specifically, the memory bank selection unit 262 acquires, from the RSSI information storage unit 251, the RSSI value of the prevailing communication standard judged by the communication quality information updating unit 261. Then, the memory bank selection unit 262 specifies the memory bank identifier including the largest absolute RSSI value acquired. The memory bank selection unit 262 instructs the bank selector 141 to activate the memory bank 1 or 2 corresponding to the specified memory bank identifier.

An example illustrated in FIG. 9 is explained. In this case, assume that the communication quality information updating unit 261 judges that the wireless LAN module 131 is active and the UMTS module 132 inactive. In such a case, the memory bank selection unit 262 acquires, from the RSSI information storage unit 251, the RSSI value "−90 dBm" stored in the RSSI information (wireless LAN) corresponding to the memory bank identifier "1" and the RSSI value "−86 dBm" stored in the RSSI information (wireless LAN) corresponding to the memory bank identifier "2". The absolute RSSI value "90 dBm" corresponding to the memory bank identifier "1" is larger than the absolute RSSI value "86 dBm" corresponding to the memory bank identifier "2". Therefore, the memory bank selection unit 262 instructs the bank selector 141 to activate the memory bank 1 corresponding to the memory bank identifier "1".

Figure 10:
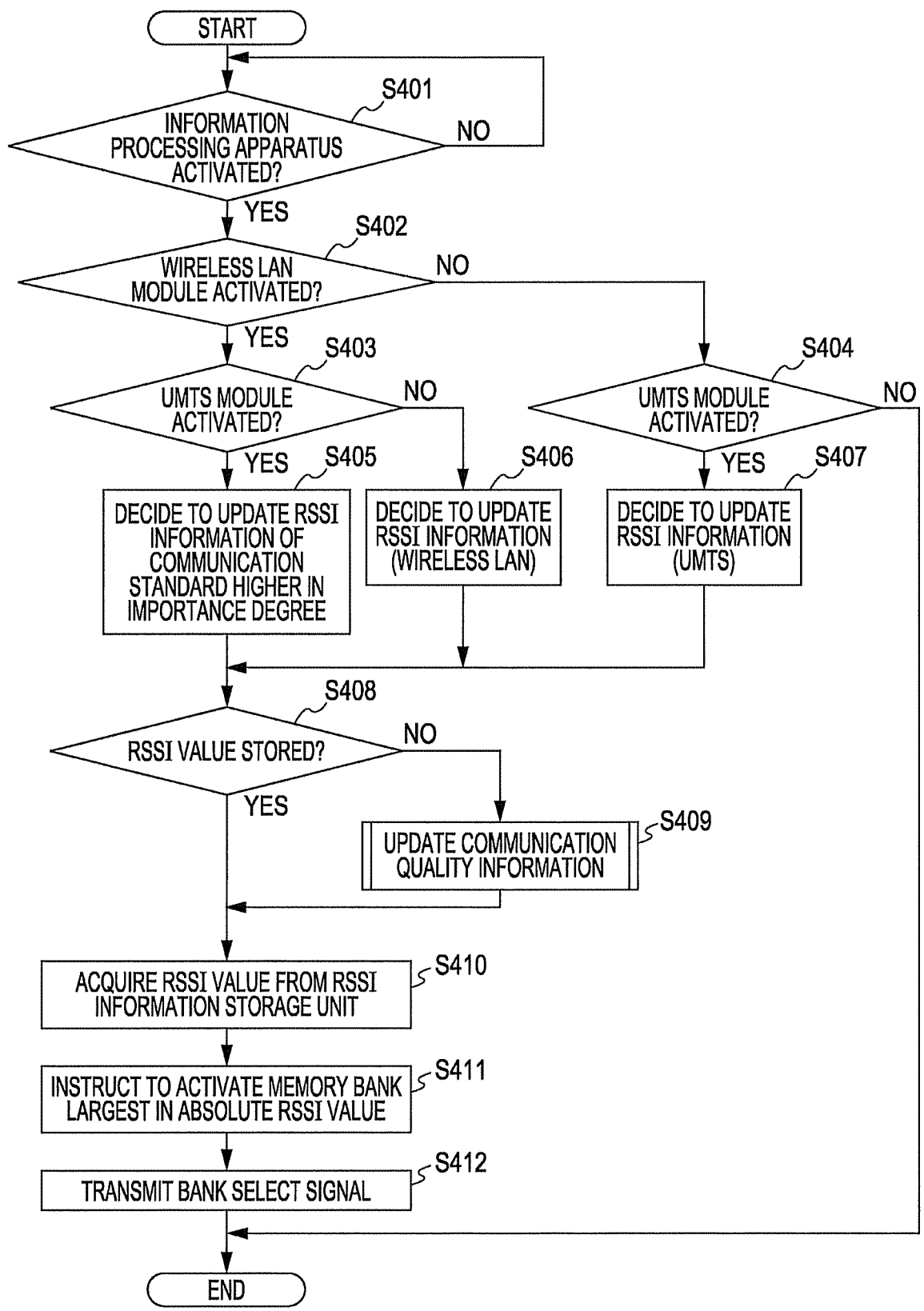
FIG. 10 is a flowchart of selecting the memory bank according to this embodiment.

Next, the memory bank selection process executed by the information processing apparatus 200 according to this embodiment is explained. FIG. 10 is a flowchart of the memory bank selection process executed by the information processing apparatus 200 according to this embodiment.

As illustrated in FIG. 10, upon activation of the information processing apparatus 200 (YES in operation S401), the communication quality information updating unit 261 of the information processing apparatus 200 judges whether the wireless LAN module 131 or the UMTS module 132 is activated or not. The steps of this judgment process (operation S402 to S407) are substantially similar to those of the process illustrated in FIG. 5 (operation S102 to S107), and therefore, not described again.

The communication quality information updating unit 261 judges whether the RSSI value corresponding to the communication standard determined in the operation S405 to S407 is stored as the RSSI information in the RSSI information storage unit 251.

In case where the RSSI value is not stored as the RSSI information in the RSSI information storage unit 251 (NO in the operation S408), the communication quality information updating process is executed to update the RSSI information of the RSSI information storage unit 251 (operation S409).

In case where the RSSI value is stored as the RSSI information in the RSSI information storage unit 251 (YES in the operation S408) or the communication quality information updating process by the communication quality information updating unit 261 is completed (operation S409), on the other hand, the memory bank selection unit 262 acquires, from the RSSI information storage unit 251, the RSSI value of the prevailing communication standard judged by the communication quality information updating unit 261 (operation S410).

Then, the memory bank selection unit 262 specifies the memory bank identifier including the largest absolute RSSI value acquired and instructs the bank selector 141 to activate the memory bank 1 or 2 indicated by the specified memory bank identifier (operation S411).

The RSSI information storage unit 251 stores the RSSI value as an indicator of the wireless communication quality. The memory bank selection unit 262, based on the RSSI value stored as the RSSI information in the RSSI information storage unit 251, instructs the bank selector 141 to use the memory bank 1 or 2, whichever is larger in the absolute RSSI value for wireless communication. The bank selector 141, in response to the instruction from the memory bank selection unit 262, transmits a bank designation signal in such a manner as to activate one of the memory banks 1 and 2. The information processing apparatus 200 according to this embodiment, therefore, reduces the interference between the noise generated from the primary storage unit 140 itself and the signal transmitted and received by the antenna 190 based on the RSSI value for wireless communication. As a result, the wireless communication quality is improved. The information processing apparatus 200 according to this embodiment is effectively applicable to a system for improving the wireless communication quality to secure a high strength of the received signal.

Still Another Embodiment

In the aforementioned embodiments, taking the effect that the noise generated from the memory bank 1 or 2 has on the signal transmitted or received by the antenna into consideration, the memory bank 1 and 2 are switched based on the BER value or the RSSI value for wireless communication in the case where one of the memory banks 1 and 2 is used by the information processing apparatus. In addition to the noise generated from the memory bank 1 or 2, however, the noise generated from the various function units of the information processing apparatus may also be taken into consideration as described below. In view of this, according to this embodiment, an explanation is given about a case in which the noises generated from the various function units of the information processing apparatus are taken into consideration in addition to the noise generated from the memory bank 1 or 2.

Figure 11:
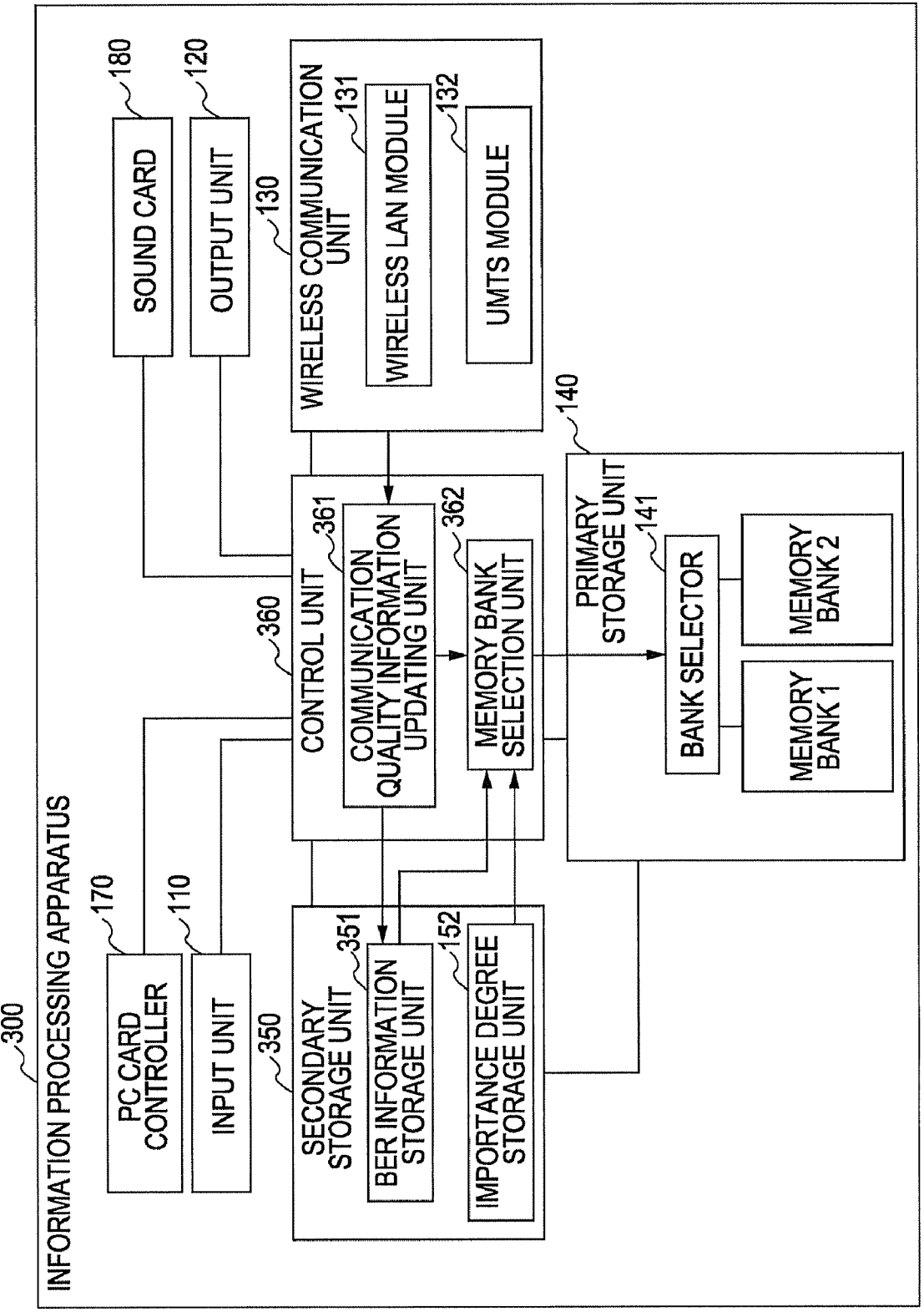
FIG. 11 is a block diagram illustrating still another embodiment.

FIG. 11 is a block diagram illustrating an information processing apparatus 300 according to this embodiment. As illustrated in FIG. 11, the information processing apparatus 300 includes an input unit 110, an output unit 120, a wireless communication unit 130, a primary storage unit 140, a PC card controller 170, a sound card 180, a secondary storage unit 350 and a control unit 360.

The PC card controller 170 controls a PC card such as a flash memory card or a LAN card. The sound card 180 processes the sound input through the input unit 110 and the sound output through the output unit 120.

The secondary storage unit 350, as compared with the secondary storage unit 150 illustrated in FIG. 2, includes a BER information storage unit 351 in place of the BER information storage unit 151. The BER information storage unit 351 stores the BER value for wireless communication in correspondence with the combination between the memory bank identifier and the active/inactive information indicating whether the various functions of the information processing apparatus 300 are active or inactive.

An example of the BER information storage unit 351 is illustrated in FIG. 12. As illustrated in FIG. 12, the BER information storage unit 351 includes the BER information (wireless LAN) and the BER information (UMTS) in correspondence with the combination between the memory bank identifier, the active/inactive information (PC card) and the active/inactive information (sound card).

The active/inactive information (PC card) is stored as the information indicating whether the PC card controller 170 is active or not, while the active/inactive information (sound card) is stored as the information indicating whether the sound card 180 is active or not. In the case where the PC card controller 170 or the sound card 180 is active, the active/inactive information is stored as "ON", and otherwise, as "OFF".

Specifically, the first row of the table illustrating the functions of the BER information storage unit 351 illustrated in FIG. 12 illustrates that in the case where the information processing apparatus 300 uses the memory bank 1 while both the PC card controller 170 and the sound card 180 are active, the BER value for wireless LAN communication is "0.32%" and the BER value for UMTS communication is "0.51%".

Also, the fourth row of the table illustrating the functions of the BER information storage unit 351 illustrated in FIG. 12 illustrates that in the case where the information processing apparatus 300 uses the memory bank 2 while the PC card controller 170 is active and the sound card 180 inactive, the BER value for wireless LAN communication is "0.23%" and the BER value for UMTS communication is "0.16%".

As described above, while the PC card controller 170 is active, the noise is generated from the PC card controller 170 and interferes with the signal transmitted or received by the antenna. The BER value changes, therefore, depending on whether the PC card controller 170 is active or not. This is also the case with the sound card 180, and the BER value changes depending on whether the sound card 180 is active or not.

The control unit 360 includes a communication quality information updating unit 361 and a memory bank selection unit 362. The communication quality information updating unit 361 judges whether the various function units of the information processing apparatus 300 are active or not after activation of the information processing apparatus 300. The communication quality information updating unit 361 acquires the BER value from the LAN module 131 or the UMTS module 132 in the case where the BER value is not stored as the BER information in the BER information storage unit 351. The communication quality information updating unit 361 stores the acquired BER value as the BER information in the BER information storage unit 351.

The process of the communication quality information updating unit 361 is specifically explained. The communication quality information updating unit 361, upon judgment that the wireless LAN module 131 is active but not the UMTS module 132 and that both the PC card controller 170 and the sound card 180 are active, then searches the BER information storage unit 351 and judges whether the BER value is stored as the BER information (wireless LAN) of the record in which both the active/inactive information (PC card) and the active/inactive information (sound card) are "ON".

In the case where the BER value is not stored as the BER information (wireless LAN), the communication quality information updating unit 361 instructs the memory bank selection unit 362 to activate the memory bank 1. After that, the communication quality information updating unit 361 acquires the BER value for wireless LAN communication from the wireless LAN module 131 with the memory bank 1 in use. The communication quality information updating unit 361 stores the acquired BER value as the BER information (wireless LAN) in the BER information storage unit 351 in which the memory bank identifier is "1", the active/inactive information (PC card) is "ON" and the active/inactive information (sound card) is "ON".

Then, the communication quality information updating unit 361 instructs the memory bank selection unit 362 to activate the memory bank 2, and acquires the BER value for wireless LAN communication from the wireless LAN module 131 with the memory bank 2 in use. The communication quality information updating unit 361 stores the acquired BER value as the BER information (wireless LAN) in the BER information storage unit 351 in which the memory bank identifier is "2", the active/inactive information (PC card) is "ON" and the active/inactive information (sound card) is "ON".

The communication quality information updating unit 361, upon judgment that the wireless LAN module 131 is active and the UMTS module 132 inactive and that the PC card controller 170 is active but not the sound card 180, searches the BER information storage unit 351 and judges whether the BER value is stored as the BER information (wireless LAN) of the record in which the active/inactive information (PC card) is "ON" and the active/inactive information (sound card) is "OFF".

In the case where the BER value is not stored as the BER information (wireless LAN), the communication quality information updating unit 361 acquires the BER value from the wireless LAN module 131 in the same manner as described above, and stores the acquired BER value as the BER information (wireless LAN) in which the active/inactive information (PC card) is "ON" and the active/inactive information (sound card) is "OFF".

In similar fashion, the communication quality information updating unit 361, upon judgment that the wireless LAN module 131 is active but not the PC card controller 170 and the sound card 180 is active, then updates the BER information (wireless LAN) of the BER information storage unit 351 in which the active/inactive information (PC card) is "OFF" and the active/inactive information (sound card) is "ON".

In similar fashion, the communication quality information updating unit 361, upon judgment that the wireless LAN module 131 is active and neither the PC card controller 170 nor the sound card 180 is active, updates the BER information (wireless LAN) stored in the BER information storage unit 351 in which both the active/inactive information (PC card) and the active/inactive information (sound card) are "OFF".

Also, the communication quality information updating unit 361, upon judgment that both the wireless LAN module 131 and the UMTS module 132 are active, acquires the importance degree from the importance degree storage unit 152. Then, the communication quality information updating unit 361 updates the BER information storage unit 351 in the same manner as described above for the communication standard higher in the acquired importance degree.

In the aforementioned case, the communication quality information updating unit 361 judges whether the PC card controller 170 and the sound card 180 are active or inactive. Nevertheless, the communication quality information updating unit 361 may judge also whether other function units (for example, the LAN chip) are active or inactive. In such a case, the BER information storage unit 351 is structured to have the active/inactive information of other function units.

The memory bank selection unit 362 selects the memory bank to improve the wireless communication quality based on the BER value stored as the BER information in the BER information storage unit 351 in which the combination of the various function units (the PC card controller 170 and the sound card 180) judged active by the communication quality information updating unit 361 coincides with the combination of the function units stored as "ON" as the active/inactive information.

In the case where the wireless LAN module 131 is active, the UMTS module 132 inactive and both the PC card controller 170 and the sound card 180 are active, for example, the memory bank selection unit 362 acquires the BER value from the BER information (wireless LAN) stored in the BER information storage unit 351 in which the active/inactive information (PC card) is "ON" and the active/inactive information (sound card) is "ON". The memory bank selection unit 362, by specifying the memory bank identifier minimizing the acquired BER value, instructs the bank selector 141 to activate the memory bank 1 or 2 corresponding to the specified memory bank identifier.

The example illustrated in FIG. 12 is explained. Assume that the wireless LAN module 131 is active, the UMTS module 132 inactive and both the PC card controller 170 and the sound card 180 are active. In this case, the memory bank selection unit 362 acquires, from the BER information storage unit 351, the BER value "0.32%" stored as the BER information (wireless LAN) with the memory bank identifier "1" and both the active/inactive information (PC card) and the active/inactive information (sound card) "ON", and the BER value "0.43%" stored as the BER information (wireless LAN) with the memory bank identifier "2" and both the active/inactive information (PC card) and the active/inactive information (sound card) "ON". The BER value "0.32%" corresponding to the memory bank identifier "1" is smaller than the BER value "0.43%" corresponding to the memory bank identifier "2", and therefore, the memory bank selection unit 362 instructs the bank selector 141 to activate the memory bank 1 corresponding to the memory bank identifier "1".

Figure 13:
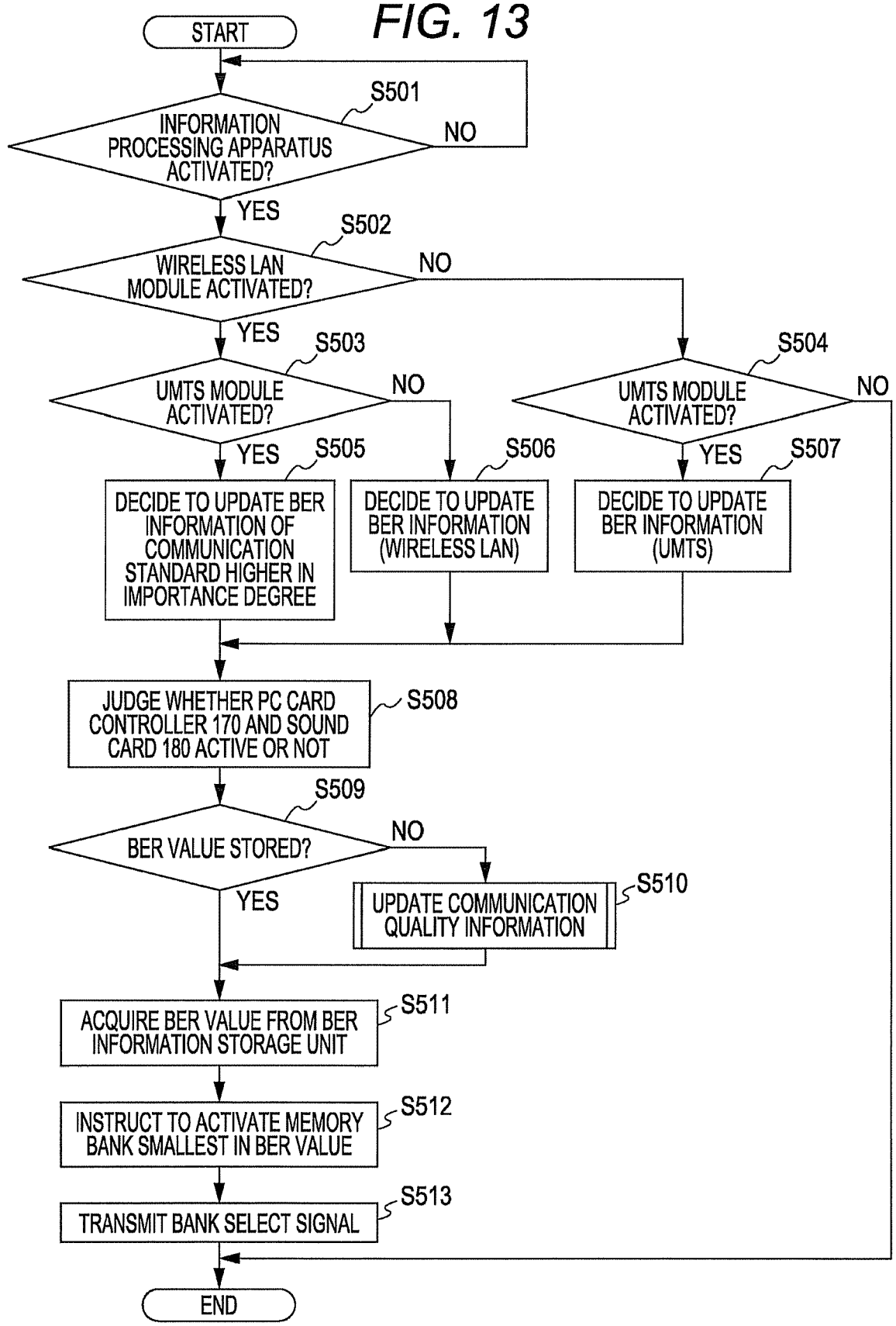
FIG. 13 is a flowchart of selecting the memory bank according to this embodiment.

Next, the memory bank selection process executed by the information processing apparatus 300 is explained. FIG. 13 is a flowchart of the memory bank selection process executed by the information processing apparatus 300 according to this embodiment.

As illustrated in FIG. 13, upon activation of the information processing apparatus 300 (YES in operation S501), the communication quality information updating unit 361 of the information processing apparatus 300 judges whether the wireless LAN module 131 or the UMTS module 132 is active or not. The steps of this judgment process (operation S502 to S507) are similar to those illustrated in FIG. 5 (operation S102 to S107) and therefore not further explained.

Then, the communication quality information updating unit 361 judges whether the PC card controller 170 and the sound card 180 are active or not (operation S508).

In the case where the BER value is not stored as the BER information in the BER information storage unit 351 in which the combination of the function units judged active coincides with the combination of the function units stored with the active/inactive information "ON" (NO in operation S509), the communication quality information updating unit 361 executes the communication quality information updating process for updating the BER information of the BER information storage unit 351 (operation S510). Incidentally, the communication quality information updating process executed by the BER information storage unit 351 is explained later with reference to FIG. 14.

In the case where the BER value is stored as the BER information in the BER information storage unit 351 (YES in operation S509) or the communication quality information updating process by the communication quality information updating unit 361 (operation S510) is complete, the memory bank selection unit 362 acquires, from the BER information storage unit 351, the BER value for which the combination of the active function units coincides with the combination of the function units stored as "ON" in the active/inactive information (operation S511).

The memory bank selection unit 362 specifies the memory bank identifier with the smallest BER value acquired and instructs the bank selector 141 to activate the memory bank 1 or 2 indicated by the specified memory bank identifier (operation S512).

Figure 14:
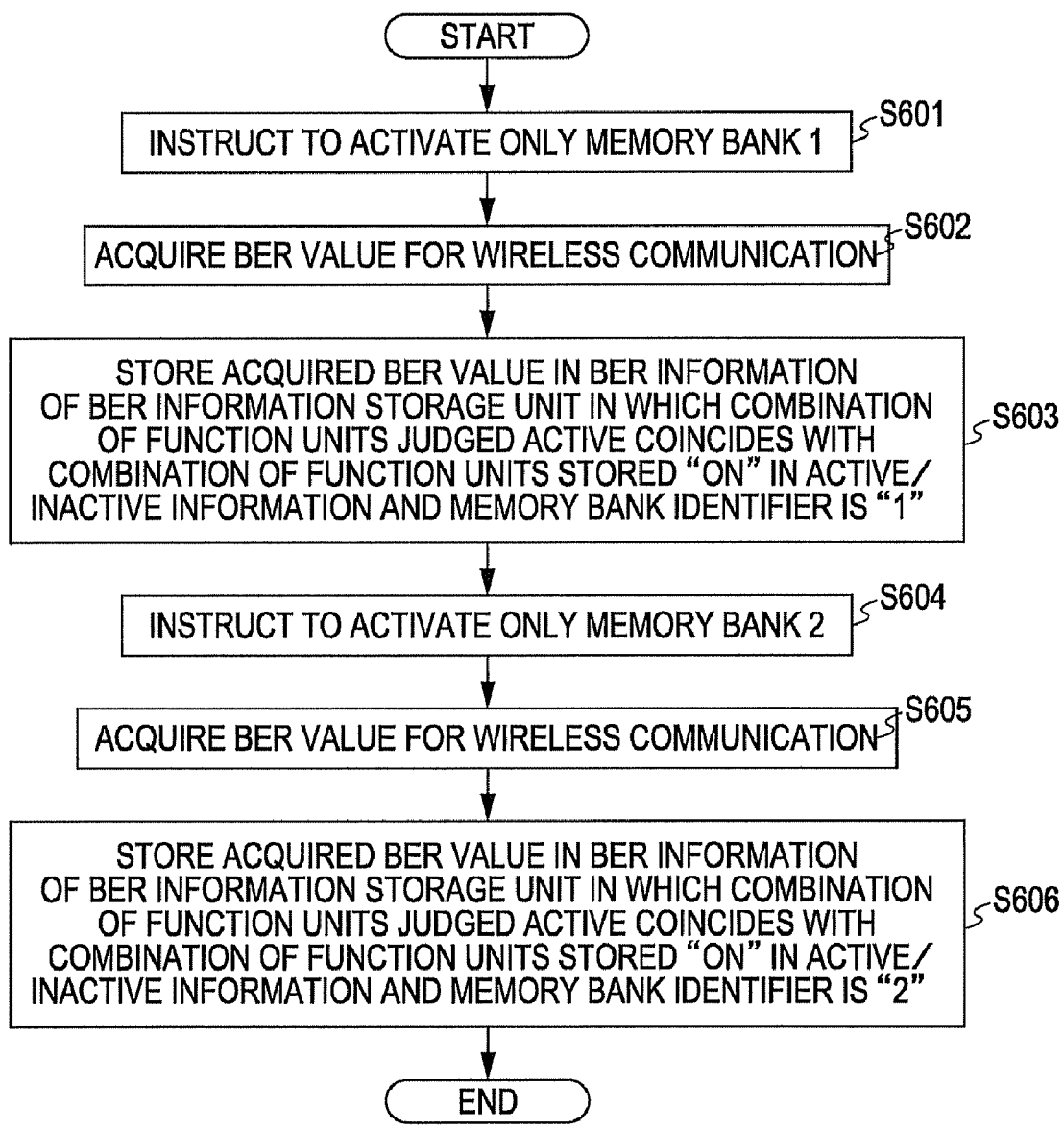
FIG. 14 is a flowchart of updating the communication quality information.

Next, the communication quality information updating process executed by the communication quality information updating unit 361 as illustrated in FIG. 11 is explained. FIG. 14 is a flowchart of the communication quality information updating process executed by the communication quality information updating unit 361 illustrated in FIG. 11.

As illustrated in FIG. 14, the communication quality information updating unit 361 instructs the memory bank selection unit 362 to activate the memory bank 1 (operation S601). After that, the communication quality information updating unit 361 acquires, from the wireless LAN module 131 or the UMTS module 132, the BER value for the wireless communication (the wireless LAN communication or the UMTS communication) with the memory bank 1 in use (operation S602).

The communication quality information updating unit 361 stores the acquired BER value as the BER information in the BER information storage unit 351 in which the combination of the various function units (the PC card controller 170 and the sound card 180) judged as active coincides with the combination of the function units stored as "ON" in the active/inactive information and the memory bank identifier is "1" (operation S603).

Assume, for example, that the wireless LAN module 131 is active, the UMTS module 132 active, the PC card controller 170 active and the sound card 180 inactive. The communication quality information updating unit 361 stores the acquired BER value as the BER information (wireless LAN) in the BER information storage unit 351 in which the memory bank identifier is "1", the active/inactive information (PC card) "ON" and the active/inactive information (sound card) "OFF".

Subsequently, the communication quality information updating unit 361 instructs the memory bank selection unit 362 to activate the memory bank 2 (operation S604) and acquires, from the wireless LAN module 131 or the UMTS module 132, the BER value for wireless communication with the memory bank 2 in use (operation S605).

The communication quality information updating unit 361 stores the acquired BER value as the BER information in the BER information storage unit 351 in which the combination of the various function units judged as active coincides with the combination of the function units stored "ON" as the active/inactive information and the memory bank identifier is "2" (operation S606).

Assume, for example, that as in the example described above, the wireless LAN module 131 is active, the UMTS module 132 inactive, the PC card controller 170 active and the sound card 180 inactive. The communication quality information updating unit 361 stores the acquired BER value as the BER information (wireless LAN) in the BER information storage unit 351 in which the memory bank identifier is "2", the active/inactive information (PC card) "ON" and the active/inactive information (sound card) "OFF".

The BER information storage unit 351 stores the BER value in correspondence with the active/inactive information indicating whether each function unit is active or not. The memory bank selection unit 362 instructs the bank selector 141 to use the memory bank 1 or 2, whichever is smaller in the BER value for wireless communication, based on whether each function unit is active or inactive and the various information stored as the BER information in the BER information storage unit 351. The bank selector 141, in accordance with the instruction from the memory bank selection unit 362, transmits a bank designation signal in such a manner as to activate one of the memory banks 1 and 2. As a result, the information processing apparatus 300 according to this embodiment reduces the interference between the noises generated from the various function units of the information processing apparatus 300 and the signal transmitted and received by the antenna 190. Thus, the wireless communication quality of the information processing apparatus 300 is improved.

Incidentally, according to this embodiment, the BER is used as an indicator of the wireless communication quality. Nevertheless, the RSSI may alternatively be used for the same purpose as the embodiment described above.

Also, unlike in the aforementioned embodiments in which the communication quality information updating unit (161, 261, 361) updates the BER information storage unit (151, 251, 351), the present embodiment is not limited to such embodiments. According to the embodiment, the information processing apparatus (100, 200, 300) may not include the communication quality information updating unit so that the BER information storage unit may not be updated. In such a case, the various pieces of information are stored in the BER information storage unit beforehand, for example, at the time of manufacturing the information processing apparatus. Also, in such a case, the process of judging the active/inactive state of the wireless LAN module 131 is executed by the memory bank selection unit (162, 262, 362) instead of by the communication quality information updating unit.

An example is explained below in which the communication quality information updating unit 161 is not included in the information processing apparatus 100 according to this embodiment. The memory bank selection unit 162, after activation of the information processing apparatus 100, judges whether the wireless LAN module 131 and the UMTS module 132 are activated or not. The memory bank selection unit 162 acquires, from the BER information storage unit 151, the BER value of the communication standard judged as active. Then, the memory bank selection unit 162 specifies the memory bank identifier small in the acquired BER value and instructs the bank selector 141 to activate the memory bank 1 or 2 indicated by the specified memory bank identifier. Also, the memory bank selection unit 162, upon judgment that both the wireless LAN module 131 and the UMTS module 132 are activated, acquires the importance degree from the importance degree storage unit 152 and executes the memory bank selection process for the communication standard highest in importance degree.

An example is explained below in which the communication quality information updating unit 361 is not included in the information processing apparatus 300 according to this embodiment. The memory bank selection unit 362, after activation of the information processing apparatus 300, judges whether the wireless LAN module 131 and the UMTS module 132 are activated or not while at the same time executing the memory bank selection process by judging whether the various function units (the PC card controller 170 and the sound card 180 in the example according to this embodiment) are activated or not.

Although the embodiment described above represents an example in which the information processing apparatus, after being activated, executes the memory bank selection process, the embodiment is not limited to such a case. The information processing apparatus may alternatively execute the memory bank selection process periodically (for example, once every hour). As another alternative, the information processing apparatus may execute the memory bank selection process in the case where the wireless LAN module 131 or UMTS module 132 is activated, that is to say, at the time of starting the wireless LAN communication or the UMTS communication. In the case where the BER information storage unit 151 is in the state illustrated in FIG. 3, for example, the information processing apparatus 100 according to this embodiment switches to the memory bank 1 used at the time of wireless LAN communication and to the memory bank 2 used at the time of UMTS communication. In this way, the memory bank used may be dynamically switched during the operation of the information processing apparatus.

The aforementioned embodiments represent a case in which the primary storage unit 140 has two memory banks 1 and 2. Nevertheless, the embodiment is not limited to such a configuration, and also applicable to a case where the primary storage unit 140 has three or more memory banks. In the case where the primary storage unit 140 has six memory banks 1 to 6, for example, the BER information storage unit 151 stores the BER value in correspondence with the memory bank identifiers "1" to "6". The memory bank selection unit 162 specifies the memory bank identifier associated with the smallest BER value stored as the BER information in the BER information storage unit 151. The memory bank selection unit 162 instructs the bank selector 141 to activate one of the memory banks 1 to 6 corresponding to the specified memory bank identifier.

Also, the embodiments are explained above in which the embodiment is applicable to the information processing apparatus including the wireless LAN communication function and the UMTS communication function. Nevertheless, the present embodiment is not limited to the embodiments, and applicable also to the information processing apparatus including the wireless LAN communication function, the information processing apparatus including the UMTS communication function and the information processing apparatus including other wireless communication functions than the wireless LAN communication and the UMTS communication function.

The processing steps, the control steps, the specific names and the information including the various data and parameters illustrated in the specification and drawings may be arbitrarily changed unless otherwise specified. Also, each element illustrated is a conceptual function, which is not necessarily coincident with the physical structure. Specifically, the whole or a part of each device may be functionally or physically distributed or integrated in arbitrary units in accordance with the various loads and operating conditions. Further, each processing function executed by each device is wholly or partly realized by the CPU and the program analytically executed by the CPU or as a hardware with a wired logic.

Although the embodiments described above represent a case in which the various processes are realized by the hardware logic. The embodiment, however, is not limited to these embodiments and a program prepared in advance may be executed by the computer. Now, with reference to FIG. 2, an explanation is given about an example of the computer executing the information processing apparatus control program including a similar function to the control unit 160 of the information processing apparatus 100 illustrated in FIG. 2.

Figure 15:
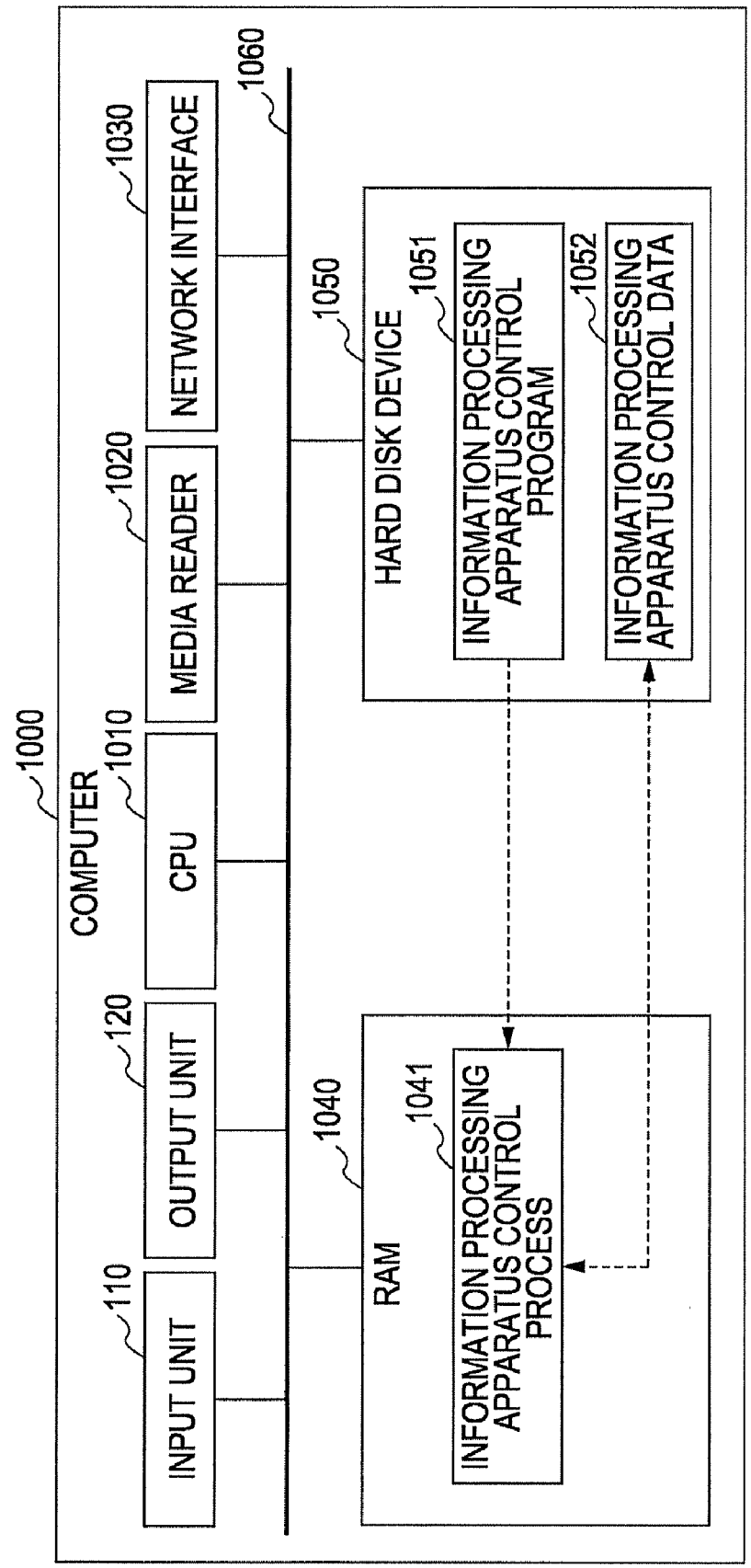
FIG. 15 is a block diagram illustrating a computer for executing an information processing apparatus control program.

FIG. 15 is a block diagram illustrating the configuration of the computer 1000 for executing the information processing apparatus control program 1051. As illustrated in FIG. 15, the computer 1000 includes an input unit 110, an output unit 120, a CPU 1010 for executing the various arithmetic operations, a media reader 1020 for reading the program and the like from a recording medium, a network interface 1030 for receiving and supplying the data from and to other transmission units through the network, a RAM (random access memory) 1040 for temporarily storing the various pieces of information and a hard disk drive 1050. All of these constituent elements are connected by a bus 1060, etc.

The hard disk device 1050 stores the information processing apparatus control program 1051 including a similar function to the control unit 160 illustrated in FIG. 2. The information processing apparatus control program 1051 may be appropriately separated in the same way as the constituent elements of the control unit 160 illustrated in FIG. 2. For example, the information processing apparatus control program 1051 may be separated into the communication quality information updating program corresponding to the communication quality information updating unit 161 and the memory bank selection program corresponding to the memory bank selection unit 162.

The CPU 1010 reads the information processing apparatus control program 1051 from the hard disk device 1050 and develops it into the RAM 1040. In this way, the information processing apparatus control program 1051 functions as the information processing apparatus control process 1041. According to the information processing apparatus control process 1041, the information read from the information processing apparatus control data 1052 is appropriately developed in the area allocated to itself on the RAM 1040. Based on the data, etc. developed in this way, the various data processes are executed. Incidentally, the information processing apparatus control data 1052 corresponds to the BER information storage unit 151 and the importance degree storage unit 152 illustrated in FIG. 2.

Incidentally, the information processing control program 1051 is not necessarily stored in the hard disk device 1050, but the program stored in the recording medium such as CD-ROM may be read and executed by the computer 1000. Also, these programs may be stored in other computer (or the server) connected to the computer 1000 through the public telephone line, the internet, LAN, WAN (Wide Area Network), etc. so that the computer 1000 may execute the program by reading it from these devices.

The information processing apparatus further includes an importance degree storage unit for storing the importance degree of the wireless communication process in correspondence with the wireless communication identifier to identify the plural wireless communication units. The communication quality information storage unit stores the communication quality information for each plural wireless communication units in correspondence with the memory bank identifier. In the case where the wireless communication process is carried out by two or more wireless communication units, the memory bank selection unit determines the wireless communication unit highest in importance degree among the two or more wireless communication units based on the importance degree stored in the importance degree storage unit. The memory bank selection unit, after determining the wireless communication unit, selects the memory bank securing the highest communication quality of the wireless communication unit highest in importance degree based on the communication quality information stored in the communication quality information storage unit. In the information processing apparatus according to this embodiment, therefore, the communication quality of the wireless communication unit including the highest importance degree is improved. As a result, the user may consciously (according to his/her preference) improve the quality of the wireless communication used or desired to use on each occasion.

The communication quality information storage unit stores the communication quality information in correspondence with the combination between memory bank identifier and the active/inactive information indicating whether each function unit of the particular information processing apparatus is active or not. The memory bank selection unit judges whether each function unit is active or not in the case where the wireless communication process is executed by the wireless communication unit. The memory bank selection unit selects the memory bank securing the highest communication quality of the wireless communication unit in operation, based on the communication quality information in which the combination of the function units judged as active coincides with the combination of the function units for which the information indicating "active" is contained in the active/inactive information of the communication quality information storage unit. In the information processing apparatus disclosed according to the embodiment, therefore, the communication quality is improved in accordance with the active/inactive state of each function unit other than the memory banks. As a result, the communication quality may be improved also for the information processing apparatus of which the main causes of the reduced communication quality are derived from the various function units (other than the memory banks).

The communication quality information updating unit acquires the communication quality information from the active wireless communication unit in the case where the communication quality information of the active wireless communication unit in the process of executing the wireless communication is not stored in the communication quality information storage unit. The communication quality information updating unit stores the acquired communication quality information in the communication quality information storage unit. The memory bank selection unit selects the memory bank securing the highest communication quality of the active wireless communication unit, based on the communication quality information stored in the communication quality information storage unit by the communication quality information updating unit. Thus, the information processing apparatus disclosed in the embodiment is not required to monitor the communication quality of the wireless communication that has never been used. As a result, the processing (judgment) time before the memory bank selection is reduced.

In the case where the wireless communication process is executed by two or more wireless communication units, the communication quality information updating unit determines the wireless communication unit highest in importance degree out of the two or more wireless communication units based on the importance degree stored in the importance degree storage unit. The communication quality information updating unit acquires the communication quality information from the wireless communication unit highest in importance degree and stores the acquired communication quality information in the communication quality information storage unit. In the information processing apparatus disclosed by the embodiment, therefore, the communication quality information of the wireless communication unit highest in importance degree is updated in priority. As a result, the communication quality information updating unit reduces the communication quality information updating time. Further, the user may consciously (according to his/her preference) improve the quality of the wireless communication used or desired to use on each occasion.

According to an aspect of the embodiments of the invention, any combinations of the described features, functions, operations, and/or benefits can be provided. According to an aspect of an embodiment, any radio (wireless communication) interfering device of the information processing apparatus, such as a memory, a storage unit including one or more memory banks, sound card, display, etc., can be positioned in a plurality of locations within the information processing apparatus according to applicable radio interference criteria in relation to a plurality of locations of two or more wireless communication controllers of the information processing apparatus and/or can be located centrally in a single area in relation to a plurality of locations or a single wireless communication controller executing one or more various/different and/or same wireless communication processes of the information processing apparatus. Further, the described communication quality update processes can further include controlling activation and/or deactivation of applicable radio interfering devices and/or wireless communication modules upon updating to obtain (or to obtain) the desired communication quality information.

The embodiments can be implemented as an apparatus (a machine) that includes computing hardware (i.e., computing apparatus), such as (in a non-limiting example) any computer that can store, retrieve, process and/or output data and/or communicate (network) with other computers According to an aspect of an embodiment, the described features, functions, operations, and/or benefits can be implemented by and/or use computing hardware and/or software. The apparatus (e.g., discussed information processing apparatuses 100, 200, 300, and 1000) comprises a controller (CPU) (e.g., a hardware logic circuitry based computer processor that processes or executes instructions, namely software/program), computer readable recording media, transmission communication media interface (network interface), and/or a display device, all in communication through a data communication bus. The results produced can be displayed on a display of the computing hardware. A program/software implementing the embodiments may be recorded on computer readable media comprising computer-readable recording media. The program/software implementing the embodiments may also be included/encoded as a data signal and transmitted over transmission communication media.

Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The data signal moves on transmission communication media, such as the wired network or the wireless network, for example, by being incorporated in a carrier wave. However, the data signal may be transferred not by the carrier wave described above but as a so-called baseband signal. Such a carrier wave is transmitted in an electrical, magnetic or electromagnetic form, or an optical, acoustic or any other form.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a storage unit including a plurality of memory banks;
a wireless communication unit executing a wireless communication process;
a communication quality information storage unit storing communication quality information indicating a communication quality of the wireless communication unit when a memory bank is utilized for the wireless communication process of the wireless communication unit, in correspondence with a memory bank identifier identifying the utilized memory bank;
a memory bank selection unit selecting a target memory bank based on the communication quality information stored in the communication quality information storage unit when the wireless communication process is to be executed by the wireless communication unit; and a memory bank switching unit switching to the target memory bank selected by the memory bank selection unit.

2. The information processing apparatus according to claim 1, further comprising:

a plurality of the wireless communication units each executing respective wireless communication processes; and an importance degree storage unit storing an importance degree of each wireless communication process in correspondence with the respective wireless communication units;

wherein the communication quality information storage unit stores the communication quality information for each wireless communication unit in correspondence with a memory bank identifier; and wherein when wireless communication processes are executable by two or more wireless communication units, the memory bank selection unit determines a wireless communication process higher in importance degree from among the two or more wireless communication processes based on the stored importance degree, and selects the target memory bank based on the determined higher importance degree wireless communication process and the corresponding communication quality information stored in the communication quality information storage unit.

3. The information processing apparatus according to claim 2, further comprising:

a communication quality information updating unit acquiring the communication quality information from an active wireless communication unit when communication quality information of the active wireless communication unit is not stored in the communication quality information storage unit, and storing the acquired communication quality information in the communication quality information storage unit together with the memory bank identifier of the memory bank utilized in the acquiring of the communication quality information;

wherein the memory bank selection unit selects the target memory bank based on the communication quality information stored in the communication quality information storage unit by the communication quality information updating unit.

4. The information processing apparatus according to claim 3, wherein when the wireless communication processes are executable by the two or more wireless communication units, the communication quality information updating unit determines the wireless communication process higher in importance degree from among the two or more wireless communication processes based on the stored importance degree, acquires communication quality information from the determined higher in importance degree wireless communication process and stores the acquired communication quality information in the communication quality information storage unit together with the memory bank identifier of the memory bank utilized in the acquiring of the communication quality information.

5. The information processing apparatus according to claim 1, further comprising a plurality of various function units to be selectively activated;

wherein the communication quality information storage unit stores the communication quality information in correspondence with a combination between the memory bank identifier and active/inactive information of the function units indicating whether a function unit is active; and wherein the memory bank selection unit judges whether each various function unit is active when a wireless communication process is executed by a wireless communication unit, and selects the target memory bank based on the communication quality information in which a combination between function units judged as active coincides with the combination of the active function units according to the information stored in the active/inactive information of the communication quality information storage unit.

6. The information processing apparatus according to claim 1, wherein the communication quality information storage unit stores an error rate of the wireless communication process executed by the wireless communication unit as the communication quality information.

7. The information processing apparatus according to claim 1, wherein the communication quality information storage unit stores a received signal strength in the wireless communication unit as the communication quality information.

8. A method of controlling an information processing apparatus including a storage unit having a plurality of memory banks and a wireless communication controller executing a wireless communication process, the method comprising:

storing communication quality information indicating a communication quality of the wireless communication process when a memory bank is utilized for the wireless communication process, in correspondence with a memory bank identifier identifying the utilized memory bank;

selecting a target memory bank based on the stored communication quality information; and switching a memory bank utilized for the wireless communication process to the selected target memory bank.

9. The method according to claim 8, the method further comprising:

storing an importance degree of each of a plurality of wireless communication processes executable by the wireless communication controller, and storing the communication quality information for each wireless communication process in correspondence with a memory bank identifier; and when wireless communication processes are executable, determining a wireless communication processes higher in importance degree from among the two wireless communication processes based on the stored importance degree; and selecting the target memory bank based on the determined higher importance degree wireless communication process and the corresponding stored communication quality information.

10. The information processing apparatus control method for controlling an information processing apparatus according to claim 9, comprising:

the communication quality information updating step for acquiring the communication quality information from the active wireless communication unit in the case where the communication quality information of the active wireless communication unit is not stored in the communication quality information storage unit, and storing the acquired communication quality information in the communication quality information storage unit together with the memory bank identifier;

wherein the memory bank selection step selects the memory bank based on the communication quality information stored in the communication quality information storage unit by the communication quality information updating step.

11. The information processing apparatus control method for controlling an information processing apparatus according to claim 10, wherein the communication quality information updating step, in the case where the wireless communication process is executed by at least two wireless communication units, determines the wireless communication unit higher in importance degree out of the at least two wireless communication units, based on the importance degree stored in the importance degree storage unit, acquires the communication quality information from the wireless communication unit higher in importance degree and stores the acquired communication quality information in the communication quality information storage unit.

12. The information processing apparatus control method for controlling the information processing apparatus according to claim 8, wherein the information processing apparatus includes various function units adapted to be selectively activated, wherein the communication quality information storage unit stores the communication quality information in correspondence with the combination between the memory bank identifier and the active/inactive information indicating whether the various function units of the particular information processing apparatus are active or not, and wherein the memory bank selection unit, in the case where the wireless communication process is executed by the wireless communication unit, judges whether the various function units are active or not, and selects the memory bank based on the communication quality information in which the combination of the function units judged as active coincides with the combination of the function units stored as active in the active/inactive information of the communication quality information storage unit.

13. A non-transitory computer readable recording medium recording an information processing apparatus control program to control the information processing apparatus including a storage unit having a plurality of memory banks and a wireless communication controller executing a wireless communication process, to execute operations comprising:

storing communication quality information indicating a communication quality of the wireless communication process when a memory bank is utilized for the wireless communication process, in correspondence with a memory bank identifier identifying the utilized memory bank;

selecting a target memory bank improving communication quality, based on the stored communication quality information; and switching a memory bank utilized for the wireless communication process to the selected target memory bank.

14. The non-transitory computer readable recording medium for recording an information processing apparatus control program according to claim 13, wherein the information processing apparatus control program includes the steps of:

storing the communication quality information for the plurality of the wireless communication units in correspondence with the memory bank identifier in the communication quality information storage table, holding, in the case where the wireless communication process is executed by at least two wireless communication units, an importance degree storage table for storing the importance degree of the wireless communication process in correspondence with the wireless communication identifier to identify the plurality of the wireless communication units, and selecting the memory bank, in the memory bank selection step, based on the communication quality information stored in the communication quality information storage table after determining the wireless communication unit higher in importance degree out of the at least two wireless communication units based on the importance degree stored in the importance degree storage table.

15. The non-transitory computer readable recording medium for recording an information processing apparatus control program according to claim 14 wherein the information processing apparatus control program includes:

the communication quality information updating step for acquiring the communication quality information from the active wireless communication unit in the case where the communication quality information of the active wireless communication unit is not stored in the communication quality information storage table, and storing the acquired communication quality information in the communication quality information storage table together with the memory bank identifier, and the memory bank selection step for selecting the memory bank based on the communication quality information stored in the communication quality information storage table by the communication quality information updating step.

16. The non-transitory computer readable recording medium for recording an information processing apparatus control program according to claim 15 wherein the information processing apparatus control program includes:

the communication quality information updating step for determining, in the case where the wireless communication process is executed by at least two wireless communication units, the wireless communication unit higher in importance degree out of the at least two wireless communication units based on the importance degree stored in the importance degree storage unit, acquiring the communication quality information from the wireless communication unit higher in importance degree, and storing the acquired communication quality information in the communication quality information storage unit.

17. The non-transitory computer readable recording medium for recording an information processing apparatus control program according to claim 13, wherein the information processing apparatus control program includes the steps of:

storing the communication quality information in the communication quality information storage table in correspondence with the combination between the memory bank identifier and the active/inactive information indicating whether each of the function units of the information processing apparatus is active or not, and selecting the memory bank in the memory bank selection step by judging whether each of the function units is active or not in the case where the wireless communication process is executed by the wireless communication unit, based on the communication quality information in which the combination of the function units judged as active coincides with the combination of the function units stored as active in the active/inactive information of the communication quality information storage table.

18. An information processing apparatus comprising:
a plurality of memories;
a wireless communication controller executing a wireless communication process; and
a computer processor to execute
storing communication quality information of the wireless communication controller executing the wireless communication process in correspondence with a memory identifier of a memory utilized by the wireless communication process; and
switching to a target memory from among the memories based on the stored communication quality information upon executing by the wireless communication controller the wireless communication process.

19. The information processing apparatus according to claim 18, wherein the wireless communication controller executes a plurality of wireless communication processes, and the computer processor further executes:
storing the communication quality information of each wireless communication process in correspondence with a memory identifier; and
when the plurality of wireless communication processes are activated, determining a wireless communication process of a higher priority from among the two or more wireless communication processes and selecting the target memory based on the determined priority of the wireless communication processor and the stored corresponding communication quality information.

* * * * *